United States Patent [19]

Yamakoshi et al.

[11] Patent Number: 5,051,775
[45] Date of Patent: Sep. 24, 1991

[54] IMAGE FORMING APPARATUS PROVIDED WITH A DEVICE FOR COVERING AND UNCOVERING A SHEET MAGAZINE

[75] Inventors: Yukiyoshi Yamakoshi, Isehara; Hiroshi Tomita, Sagamihara; Hajime Takei, Machida; Fuminori Moro, Machida; Naoyuki Matsuda, Machida; Homare Sano, Machida, all of Japan

[73] Assignee: Minolta Camera Kabushiki Kaisha, Osaka, Japan

[21] Appl. No.: 612,077

[22] Filed: Nov. 9, 1990

[30] Foreign Application Priority Data

Nov. 10, 1989 [JP] Japan .................................. 1-293067

[51] Int. Cl.$^5$ ...................... G03B 27/58; G03B 17/26
[52] U.S. Cl. ......................................... 355/72; 281/34; 354/277
[58] Field of Search ............................. 355/27, 72, 91; 354/275, 277; 281/34

[56] References Cited

U.S. PATENT DOCUMENTS

| | | | |
|---|---|---|---|
| 4,437,759 | 3/1984 | Mizukami et al. | 355/91 |
| 4,526,463 | 7/1985 | Hickey et al. | 355/91 X |
| 4,557,595 | 12/1985 | Freundt | 355/72 |
| 4,621,272 | 11/1986 | Toriumi et al. | 354/275 X |
| 4,933,696 | 6/1990 | Schmidt et al. | 354/277 |
| 4,942,426 | 7/1990 | Jones et al. | 355/91 X |
| 4,982,229 | 1/1991 | Inada et al. | 355/91 |
| 5,006,884 | 4/1991 | Kazuhito et al. | 355/72 X |

FOREIGN PATENT DOCUMENTS 57-38669 8/1982 Japan .
63-11936 1/1988 Japan .
1293067 11/1989 Japan .

Primary Examiner—Richard A. Wintercorn
Attorney, Agent, or Firm—Price, Gess & Ubell

[57] ABSTRACT

An image forming apparatus provided with a magazine in which sheets are stacked, the image forming apparatus comprising a flexible cover member for the magazine, which cover member is capable of adhering to and separating from a flange of the magazine, a cover removing unit which removes the cover member from the flange of the magazine while moving in one direction along the flange of the magazine, and a cover sticking unit which sticks the cover member on the flange of the magazine while moving in a direction reverse to the direction in which the cover removing unit moves.

12 Claims, 33 Drawing Sheets

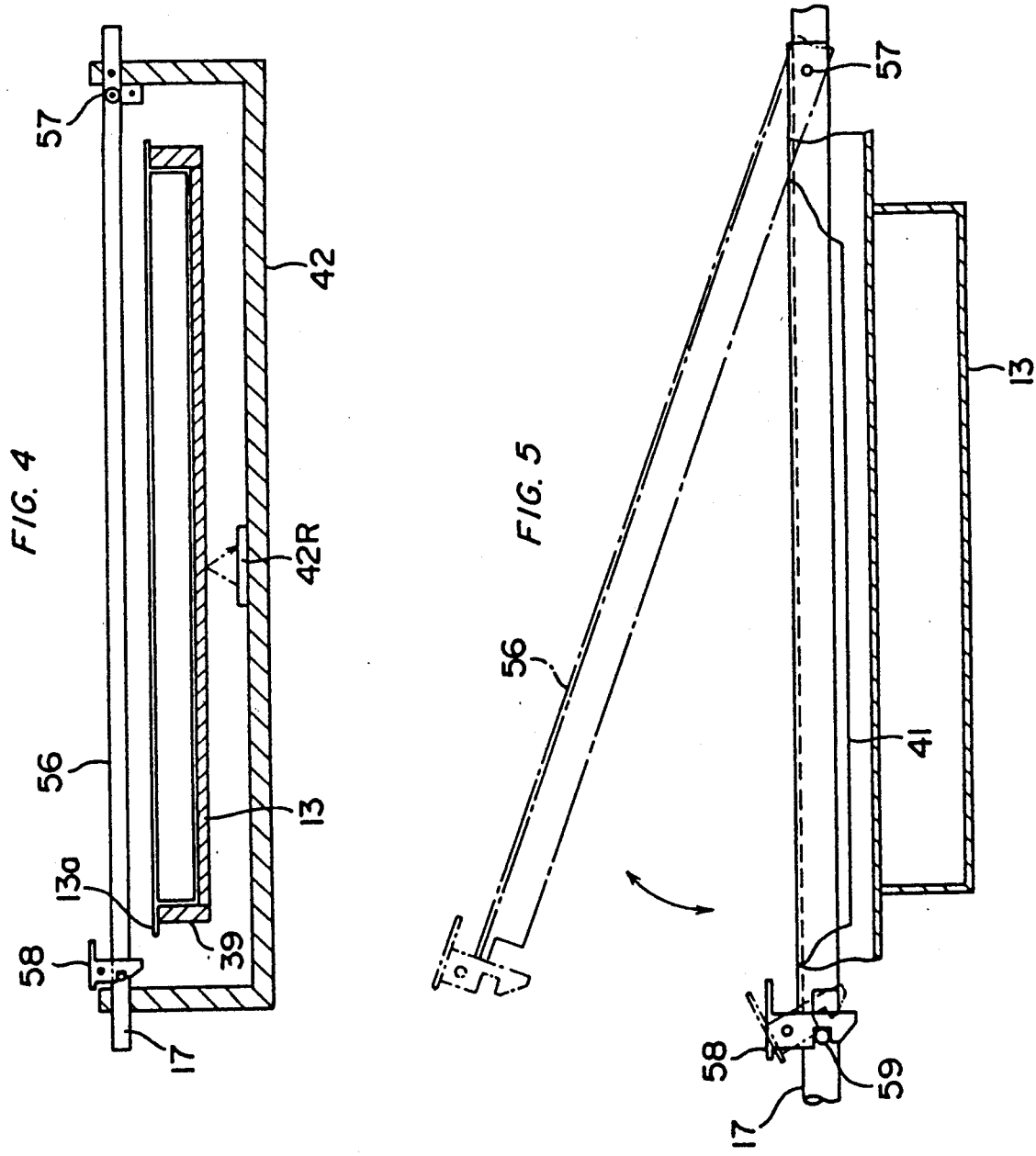

( Magazine empty detecting operation )

S281 Motor 62 ON (Unit 22 DOWN)

S282 Sensor 88 ON? NO → (loop back); YES ↓

S283 Motor 62 OFF

S284 Sensor 87 ON? NO → S288; YES ↓

S285 Motor 62 ON (Unit 22 UP)

S286 Sensor 86 ON? NO → (loop back); YES ↓

S287 Motor 62 OFF ( Return )

S288 Indication of magazine empty

S289 Motor 62 ON (Unit 22 UP)

S290 Sensor 86 ON? NO → (loop back); YES ↓

S291 Motor 62 OFF

S292 Cover unwinding operation ( End )

IMAGE FORMING APPARATUS PROVIDED WITH A DEVICE FOR COVERING AND UNCOVERING A SHEET MAGAZINE

BACKGROUND OF THE INVENTION

1. Field of the Invention

The present invention relates to an image forming apparatus provided with a device for covering and uncovering a magazine in which sheets are stacked.

2. Description of Related Art

Various types of sheet magazines have been developed in order to be adopted in laser printers. A well-known type is a magazine having a removable cover in order to shield the sheets in the magazine from light and moisture. Japanese Patent Laid-Open Publication No. 63-11936 discloses that a covered magazine is loaded in a laser printer in a manner to leave a part of the cover outside of the printer so that the cover can be removed from the magazine by pulling the part of the cover protruding from the printer.

In using the type of magazine, however, once the cover is removed from the magazine, it is impossible to cover the magazine again without discharging the magazine from the printer. Hence, when the magazine is stored with photosensitive films and the magazine is to be replaced with another magazine, the operator must change magazines in a darkroom.

SUMMARY OF THE INVENTION

It is therefore an object of the present invention to provide an image forming apparatus wherein a magazine is automatically uncovered and covered.

An object of the present invention is further to provide an image forming apparatus wherein the adhesion of a cover to a magazine is never weakened by repeated motions of the cover, adhering to and separating from the magazine.

In order to attain the objects above, an image forming apparatus according to the present invention is provided with a magazine in which sheets are stacked, and comprises a flexible cover member for the magazine, which cover member is capable of adhering to and separating from a flange of the magazine; cover removing means which removes the cover member from the flange of the magazine while moving in one direction along the flange of the magazine; and cover sticking means which sticks the cover member on the flange of the magazine while moving in a direction reverse to the direction of the cover removing means moves.

With the structure above, the magazine becomes automatically uncovered as the cover removing means is moving in the direction, and automatically covered as the cover sticking means is moving in the reverse direction. Thereby, even when the magazine is stored with photosensitive films, there is no need for the operator to change magazines in a darkroom.

In the image forming apparatus according to the present invention, preferably, the cover removing means and the cover sticking means move in a body. It is also preferable that the cover sticking means has a roller coated with elastic material, thereby preventing the cover member from wrinkling and ensuring firm adhesion of the cover to the magazine.

BRIEF DESCRIPTION OF THE DRAWINGS

These and other objects and features of the present invention will become apparent from the following description taken in conjunction with the preferred embodiment thereof with reference to the accompanying drawings.

The drawings show an exemplary image forming apparatus embodying the principles and features of the present invention in which;

FIGS. 4 and sectional views of the cover sticking-/removing device, crossed along the line T-T in FIG. 2;

FIG. 32 is a flowchart showing a procedure of performing a magazine empty detecting operation.

DETAILED DESCRIPTION OF THE PREFERRED EMBODIMENTS

An exemplary image forming apparatus embodying the principles and features of the present invention is hereinafter described in reference to the accompanying drawings.

Figure 1:
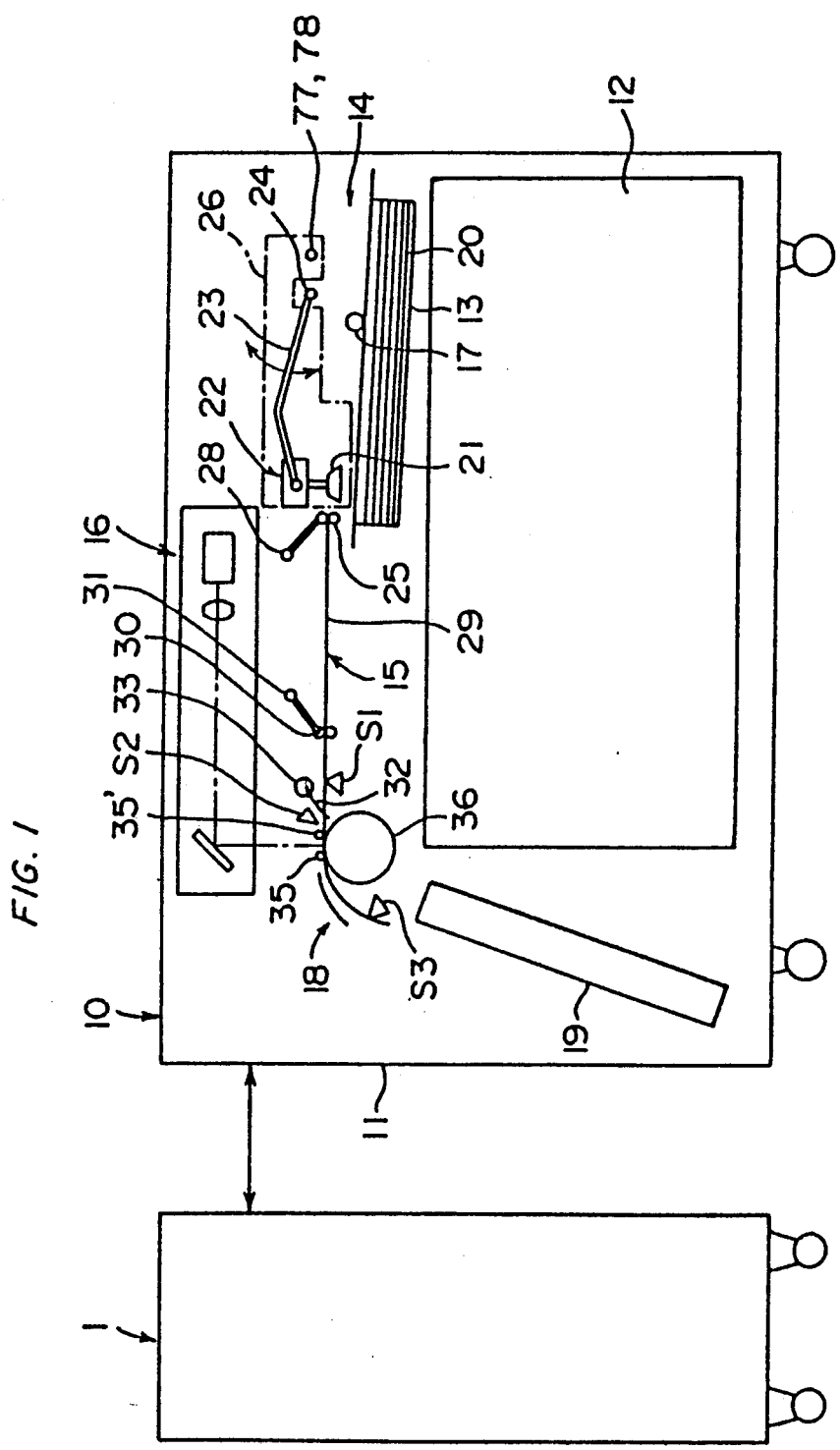
FIG. 1 is a view of a printer provided with a film feeder, which view shows the general structure of the printer.

FIG. 1 shows the general structure of a printer according to the present invention. The printer 10 has a box-type housing 11, and in the housing 11 are provided a power supply box 12, a film magazine 13, a film feeder 14, a film transport unit 15, an optical unit 16, a sub-scan unit 18 and a receive magazine 19. The interior of the housing 11 is shielded form light.

The magazine 13, in which unexposed films 20 are stacked, is disposed above the power supply box 12, and a film cover 41 (see FIG. 2) is provided so as to cover and uncover the films 20 automatically.

Above the magazine 13 is disposed the vacuum type film feeder 14 for feeding the films 20 out of the magazine 13 one by one. In the film feeder 14, a sucker holding unit 22 holding vacuum suckers 21 is fixed on arms 23 at the end. The arms 23 are capable of pivot on shafts 24 in the directions shown by the arrow in a manner to enable the vacuum suckers 21 to be kept in the horizontal posture, so that the vacuum suckers 21 suck the topmost film of the film stack 20 to feed it between transport rollers 25 disposed at the entrance of the film transport unit 15.

Film guide plates 26 are disposed above the side edges of the magazine 13 and are capable of pivot on shafts 77 and 78 respectively. The guide plates 26 regulate each film picked up from the magazine 13 with regard to the widthwise direction.

The transport rollers 25 of the film transport unit 15 are composed of a lower roller which is a driving roller and an upper roller which is a driven roller, and the upper roller is capable of pivoting on a shaft 28 so that the rollers 25 come into contact with each other and separate from each other. While the rollers 25 are separate from each other, the leading edge of a film picked up by the film feeder 14 is inserted between the rollers 25, successively the upper roller comes into contact with the lower roller to pinch the film, and then the film is transported onto a guide plate 29. In the center of the transport unit 15 are disposed diskew rollers 30 which are composed of an upper roller and a lower roller. The upper roller, which is a driving roller, is capable of pivoting on a shaft 31. The diskew rollers 30 are provided in order to correct the skew of the film transported by the rollers 25. The leading edge of the film contacts with a stopper 32, which is capable of pivoting on a shaft 33, and comes to a stop regulated by the stopper 32.

Next, the film is released from the regulation by the stopper 32 and comes into the sub-scan unit 18 comprising upper rollers 35 and 35' which are freely rotatable and coated with elastic material, and a sub-scan drum 36 which is a driven drum. While the film is moving in the sub-scan unit 18, it is exposed to a laser beam which is radiated from the optical unit 16 in the direction along the axis of the subscan drum 36. The thus exposed film is received by the magazine 19. The receive magazine 19 in which exposed films are stored is discharged from the printer 10 shielding the films from light, and thereafter the films are developed. Further, instead of the receive magazine 19, a developing device may be installed inside the printer 10 so that each film is developed inside the printer 10 as soon as it has been exposed. In this case, the developed films are ejected from the printer 10 one after another.

A film sensor S1 is fixed on the guide plate 29 in the transport unit 15, and film sensors S2 and S3 are provided in the sub-scan unit 18. What the sensor S2 directly detects is the vertical motion of the upper roller 35', and whether any films are absent or present between the roller 35' and the sub-scan drum 36, and whether the film(s) therebetween is(are) single or plural are judged from the volume of the film(s) between the roller 35' and the drum 36.

Incidentally, a host machine 1 is placed next to the printer 10, and image data are transmitted from the host machine 1 to the printer 10 for one image at a time.

Figure 2:
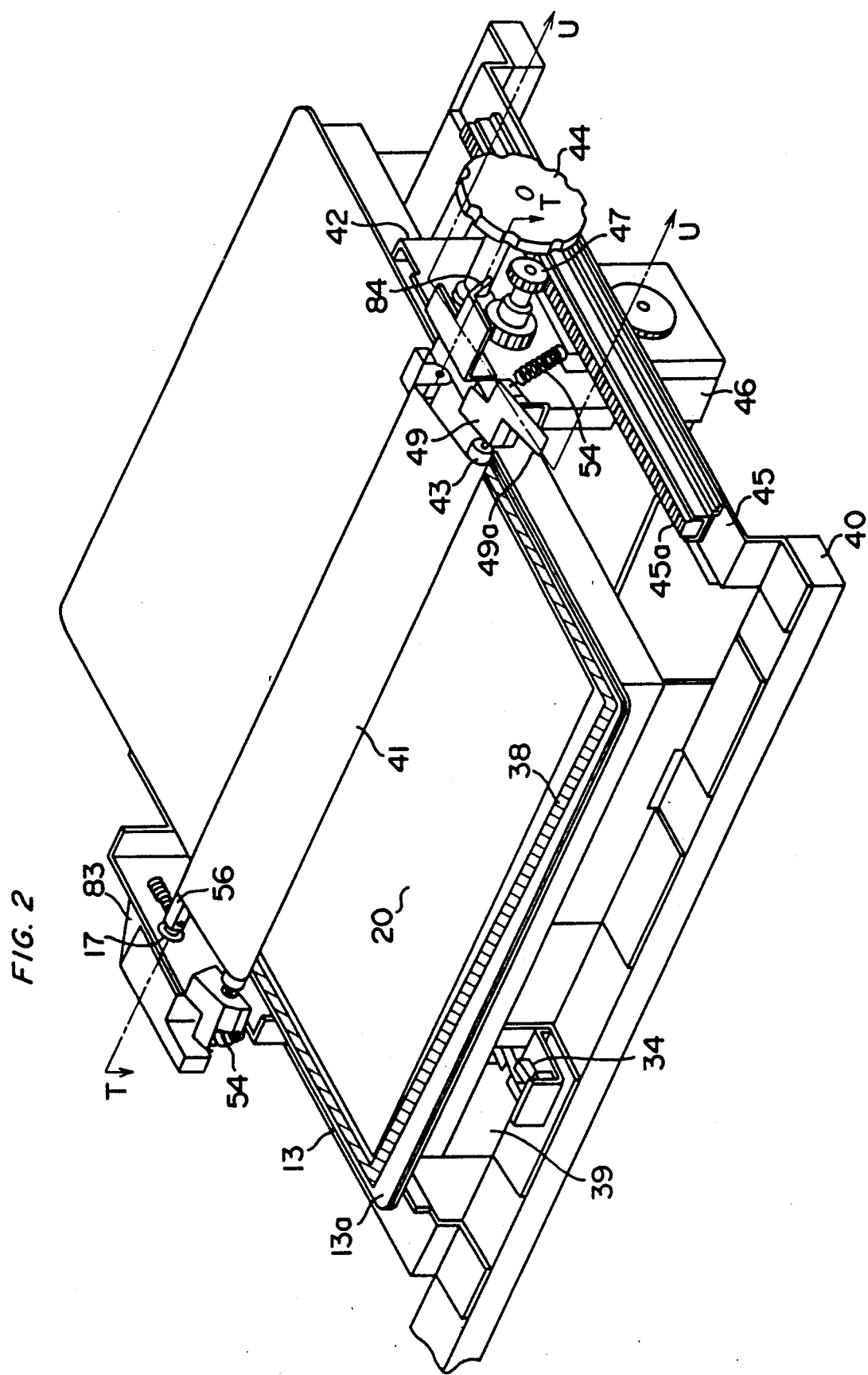
FIG. 2 is a perspective view of a cover sticking-/removing device.

FIG. 2 shows the general structure of a film cover sticking/removing device. The box-type magazine 13 is made of plastic, and it shields the film stack 20 from light. The magazine 13 has a flange 13a on the upper part. The flange 13a is either stuck with an adhesive tape 38 or coated with adhesive 38. The film cover 41 having flexibility is disposed over the magazine 13, and the cover 41 repeats adhering to the flange 13a stuck with the adhesive tape or adhesive 38 and separating therefrom. A bar code is stuck on the bottom of the magazine 13, which bar code represents the size of the films 20 stacked in the magazine 13.

Figure 3:
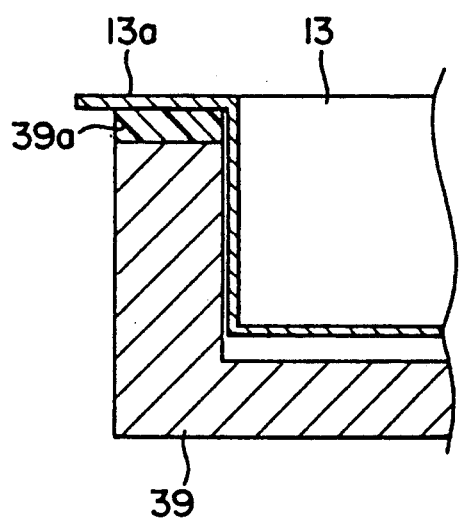
FIG. 3 is a cross sectional view of a magazine and a magazine frame, which view shows a place in detail where the magazine is mounted.

The magazine 13 which is mounted in a magazine frame 39 is loaded in the housing 11. On the part of the magazine frame 39 where the flange 13a of the magazine 13 contacts, a rubber pad 39a is provided (see FIG. 3), so that the magazine 13 is supported by the frame 39 via the pad 39a. The magazine frame 39 is integrated with a base table 40, and a sensor 34 for detecting whether the magazine 13 is mounted in the frame 39 is provided on the base table 40. When a door (not shown) of the housing 11 is open, the base table 40 is able to be drawn out of the housing 11 in the right downward direction in FIG. 2. The loading of the magazine 13 in the housing 11 is completed with drawing the base table 40 out of the housing 11.

FIG. 4 is a sectional view of a film cover winding section, where the film cover 41 of the magazine 13 is wound to uncover the films 20 in the magazine 13 and is unwound to cover the films 20, crossed along the line T-T in FIG. 2. Referring to FIG. 4, a U-shaped frame 42 encloses the magazine 13 and the magazine frame 39 therein, and a shaft 17 is rotatably laid between the both sides, fitted on the top of the frame 42. A roller 43 for pressing the film cover 41 against the flange 13a of the magazine 13 is provided on the frame 42. Protrusions are disposed on the both sides of the frame 42, and each of the protrusions has a pinion 47 at the end. The pinions 47 are engaged with the respective racks 45a on rack holders 45 bridged over the base table 40. Thereby, the frame 42 supporting the winding shaft 17 and the pressing roller 43 is able to move on the magazine 13 along the flange 13a. At the right side of the frame 42 are provided a transmission system (not shown) and a winding motor 46 for driving the shaft 17 and moving the whole winding section. As the pinions 47 are rotated and engaged with the respective racks 45a, the winding section supported by the frame 42 moves as a whole.

On the surface of the frame 42 where the bottom of the magazine 13 opposes, a bar code reader 42R is provided to read the bar code stuck on the bottom of the magazine 13 and judge the size of the films 20 in the magazine 13.

Figure 6:
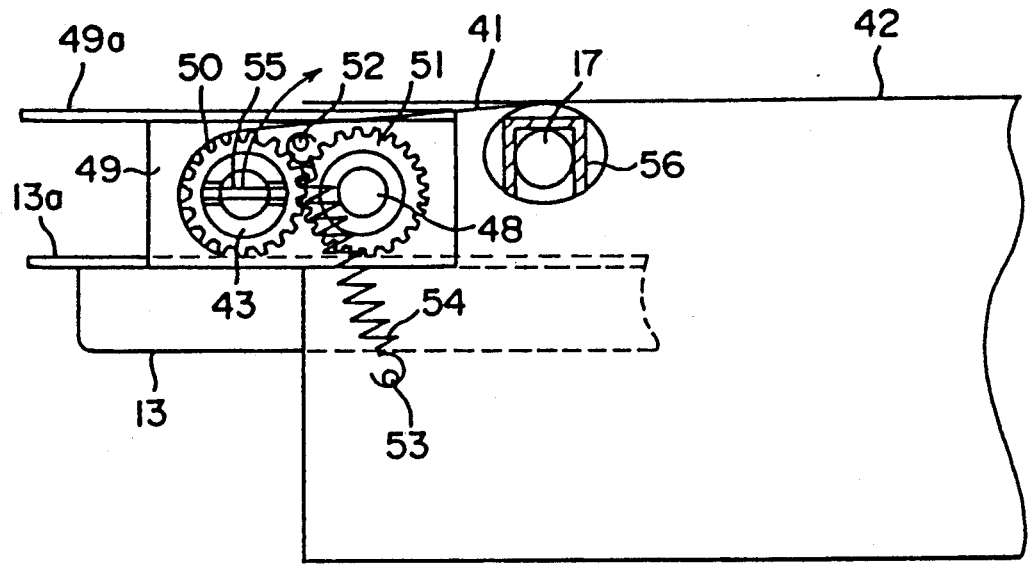
FIGS. 6 and 7 are sectional views of the cover sticking/removing device, crossed along the line U-U in FIG. 2, which views show the motion of a pressing roller.
Figure 7:
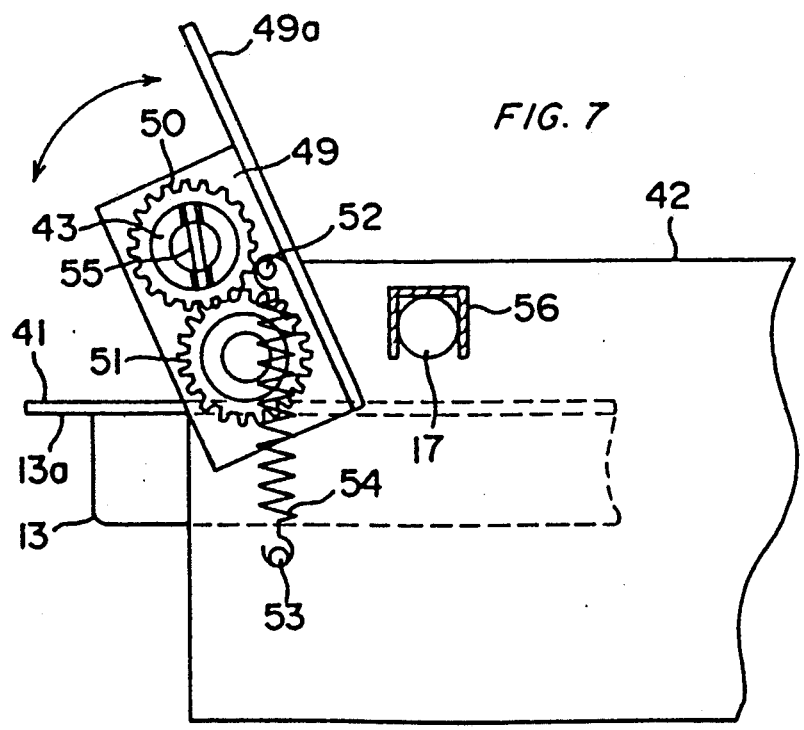

Now referring to FIGS. 6 and 7, the detailed structure of the pressing roller 43 and the neighborhood is described. FIGS. 6 and 7 are sectional views of the film winding section, crossed along the line U-U in FIG. 2. FIG. 6 shows a state in which the pressing roller 43 is set, and FIG. 7 shows a state in which the pressing roller 43 is not set. On each side of the front edge of the frame 42, a lever 49 is disposed so that it is capable of pivoting on a shaft 48, and the pressing roller 43, which is coated with elastic material such as rubber, is rotatably laid between the levers 49. Gears 50 are fitted around the both ends of the pressing roller 43 via pins 55 respectively so that the gears 50 rotate following the pressing roller 43. Gears 51 are fixed around the shafts 48 and are not rotatable. The gears 50 are engaged with the respective gears 51 with a little play. A pin 52 is standing on each of the levers 49 at the upper central part, and a pin 53 is provided at each side of the frame 42. At each side of the frame 42, a spring 54 is laid between the pins 52 and 53. In a state in which tabs 49a of the levers 49 are pressed down to set the pressing roller 43 as shown in FIG. 6, the pressing roller 43 is pulled onto the film cover 41 by the force of the springs 54 to press the film cover 41 against the flange 13a of the magazine 13. In this state, in cooperation with the rubber pad 39a between the magazine frame 39 and the magazine 13, the pressing roller 43 works to stick the cover 41 on the flange 13a uniformly and firmly. A process of getting the pressing roller 43 unset as shown in FIG. 7 is as follows. As the operator pulls the tabs 49a upward, the gears 50 move upward rotating around the respective gears 51. In this moment, the operator may pull only one of the tabs 49a because the rotation of the pressing roller 43 is transmitted to the other tab 49a. Thus, the both levers 49 move upward smoothly, and simultaneously the pressing roller 43 moves upward, which motion eliminates obstructions to change magazines. As shown in FIG. 7, while the lever 49 are not set, the levers 49 are locked by locking means (not shown). By releasing the levers 49 from the locking means, the levers 49 are back to the set state.

The structure around the winding shaft 17 is hereinafter described referring to FIG. 5 which is a sectional view, crossed along the line T-T in FIG. 2. The winding shaft 17 is rotatably supported by the sides of the frame 42 so that the shaft 17 is laid over the frame 42, and the shaft 17 is driven to rotate by the winding motor 46 shown in FIG. 2 via a gear group (not shown) A clamp 56, a cross section of which is U-shaped as shown in FIGS. 6 and 7, is disposed over the winding shaft 17, and the clamp 56 is capable of pivoting on a pin 57 as shown in FIG. 5. To the free end (the left end in FIG. 5) of the clamp 56, a hook 58 for locking the clamp 56 is fixed, and the clamp 56 is locked by engaging the hook 58 with a pin 59 standing on the winding shaft 17.

When the cover 41 starts to be wound, the leading portion of the film cover 41 is folded back around the pressing roller 43, and the end is nipped between the winding shaft 17 and the clamp 56. Then, the clamp 56 is locked by the engagement of the hook 58 with the pin 59, which ensures the nip of the cover 41 between the winding shaft 17 and the clamp 56. Thereafter, as the winding shaft 17 is rotating, the film cover 41 is wound around the shaft 17.

Further, a dial 44 is provided in the cover winding section at an edge of the winding shaft 17, which arrangement enables the operator to operate the cover winding section manually.

Figure 8:
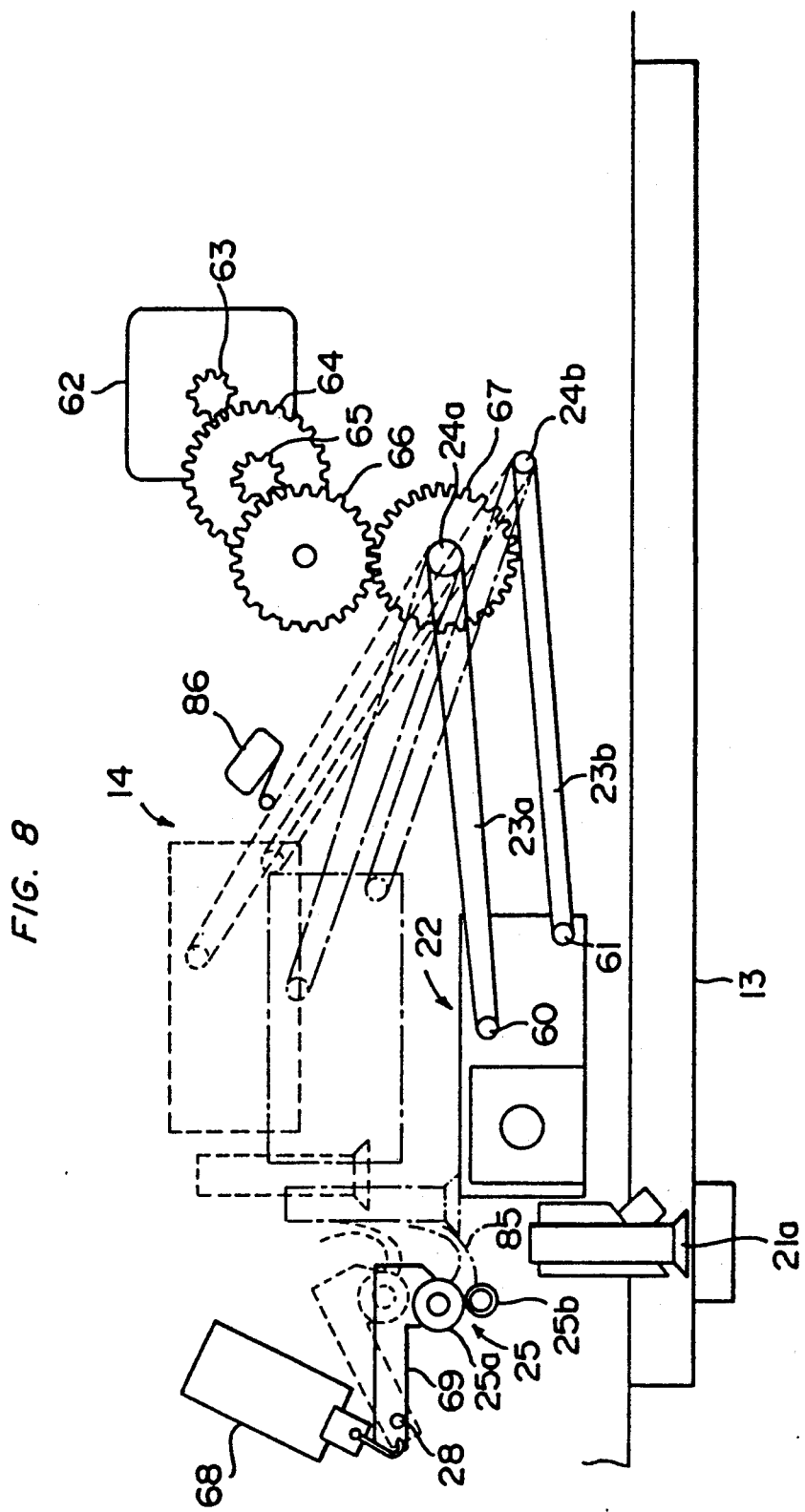
FIG. 8 is a side view of the film feeder.
Figure 9:
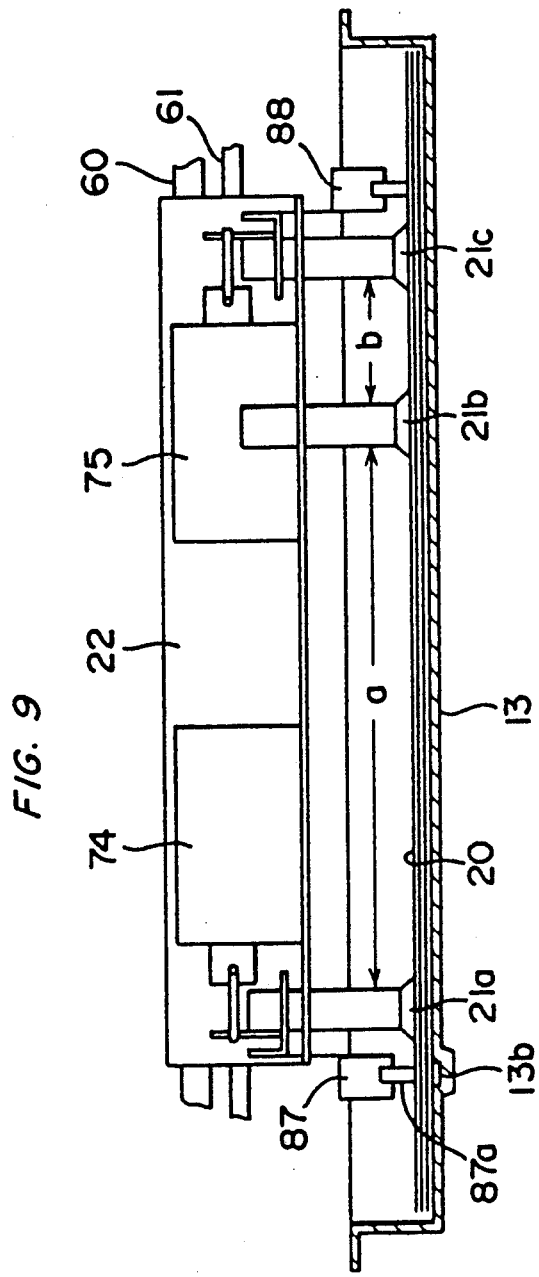
FIG. 9 is a front view of the film feeder, which view shows a state where the magazine is cut away partially.
Figure 10:
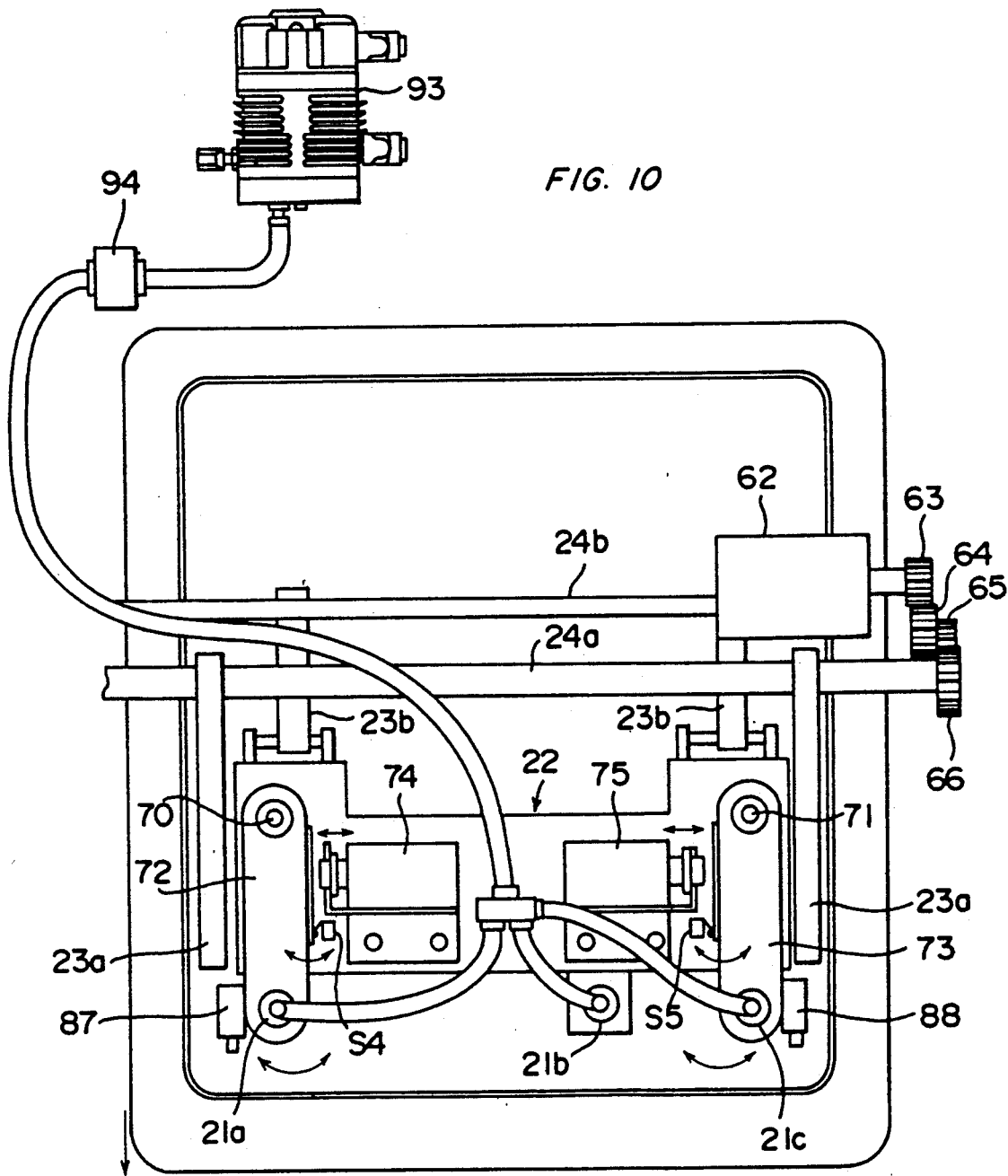
FIG. 10 is a plan view of the film feeder.

Referring to FIGS. 8, 9 and 10, the structure of the film feeder 14 which feeds films from the magazine 13 to the film transport unit 15 is hereinafter described. FIGS. 8, 9 and 10 show the principle part of the film feeder 14. FIG. 8 is a side view, FIG. 9 is a front view, and FIG. 10 is a plan view thereof. The film feeder 14 includes three vacuum suckers 21a, 21b and 21c which are supported by the sucker holding unit 22 so that they are in a line perpendicular to the direction of the film feed at intervals "a" and "b". The interval "a" between the suckers 21a and 21b is larger than the interval "b" between the suckers 21b and 21c. The sucker holding unit 22 is supported by pairs of arms 23a and 23b by fitting the arms 23a and 23b to shafts 60 and 61 respectively. The two arms 23a are connected to a shaft 24a and the other two arms 23b are connected to a shaft 24b. The drive force of a motor 62 is transmitted to the shaft 24a via gears 63 through 67 so as to rotate the shaft 24a. Thereby, the sucker holding unit 22 is movable between the position indicated by the solid line and the position indicated by the dashed line in FIG. 8. Referring to FIG. 8, the transport rollers 25 composed of an upper roller 25a and a lower roller 25b are disposed opposite a film feeding position of the sucker holding unit 22 indicated by the chain line. The upper roller 25a is supported by a holder 69 connected to a solenoid 68, and the holder 69 is capable of pivoting up and down on a shaft 28. Thereby, the upper roller 25a moves up and down following the motion of the holder 69. The holder 69 is provided with a sensor 85 (only the actuator of the sensor 85 is shown in FIG. 8) for detecting whether a film is nipped between the transport rollers 25. Further, a sensor 86 which detects one of the arms 23a is fixed on the frame (not shown) of the printer 10 to judge whether the sucker holding unit 22 reaches the highest position.

The sucker holding unit 22 moves downward so that the suckers 21a, 21b and 21c suck the topmost film of the film stack 20 in the magazine 13. Thereafter, the holding unit 22 and the suckers 21a, 21b and 21c move to the film feed position shown by the chain line in FIG. 8, and the leading edge of the sucked film is placed on the lower roller 25b while the upper roller 25a is upwardly recedes from the lower roller 25b. Then, the upper roller 25a moves down to nip the leading edge of the film. The film nipped between the rollers 25a and 25b is transported onto the guide plate 29 in the transport unit 15 as the lower roller 25b is rotating The suckers 21a, 21b and 21c are connected with a vacuum pump 93 by tubes via a valve 94. The sucker 21b which is disposed in the middle is fixed on the sucker holding unit 22, and the other suckers 21a and 21c are fitted to oscillating plates 72 and 73 respectively. More specifically, the plates 72 and 73 are fitted around shafts 70 and 71 and are capable of pivoting on the respective shafts 70 and 71, and the suckers 21a and 21c are fitted to the free ends of the plates 72 and 73 respectively. The plates 72 and 73 are moved inwardly as indicated by the arrows in FIG. 10 by solenoids 74 and 75 respectively. In the film feed position, before the sucked film is fed to the rollers 25, the suckers 21a and 21c are inwardly moved toward the sucker 21b by the solenoids 74 and 75 so that the sucked film waves. At that time, the portion around the sucker 21a and the portion around the sucker 21c wave differently because of the different intervals among the suckers 21a, 21b and 21c. With this arrangement, even when the suckers 21a, 21b and 21c suck one film, this wave of the topmost film produces a gap between the topmost film and the succeeding films, and the succeeding films separate from the topmost film and fall down. Further, in order to separate films more effectively, the motions of the suckers 21a and 21c to make a wave at the respective portions are carried out with an appropriate time lag.

Sensors S4 and S5 for detecting the oscillation of the plates 72 and 73 are disposed inside of the respective plates 72 and 73. The sensors S4 and S5 are used for determining whether the plates 72 and 73 can move against the stiffness of the film(s) sucked by the suckers 21a, 21b and 21c.

Also, sensors 87 and 88 are disposed outside of the suckers 21a and 21c respectively to detect whether there are any films in the magazine 13, whether the suckers 21a, 21b and 21c are catching any films, and whether the arms 23a and 23b are in the lowest position. The sensor 87 extends an actuator 87a downward, and a concavity 13b is formed on the bottom of the magazine 13 at a place which is right below the actuator 87a. When the sucker 21a comes down to the magazine 13, if the actuator 87a comes into the concavity 13b, the sensor 87 is not turned on, which means that there are no films in the magazine 13.

Now referring to FIGS. 11, 12, 13 and 14, the film guide Plates 26 for regulating a sucked film in relation to the widthwise direction is hereinafter described. The guide plates 26 are provided to prevent each film from traveling askew to an exposure station, that is, the sub-scan unit 18. Generally, various sizes of films are used in such a printer. In this embodiment, two sizes of films are regulated with reference to a center line by two pairs of guide plates 26a and 26b respectively.

Figure 11:
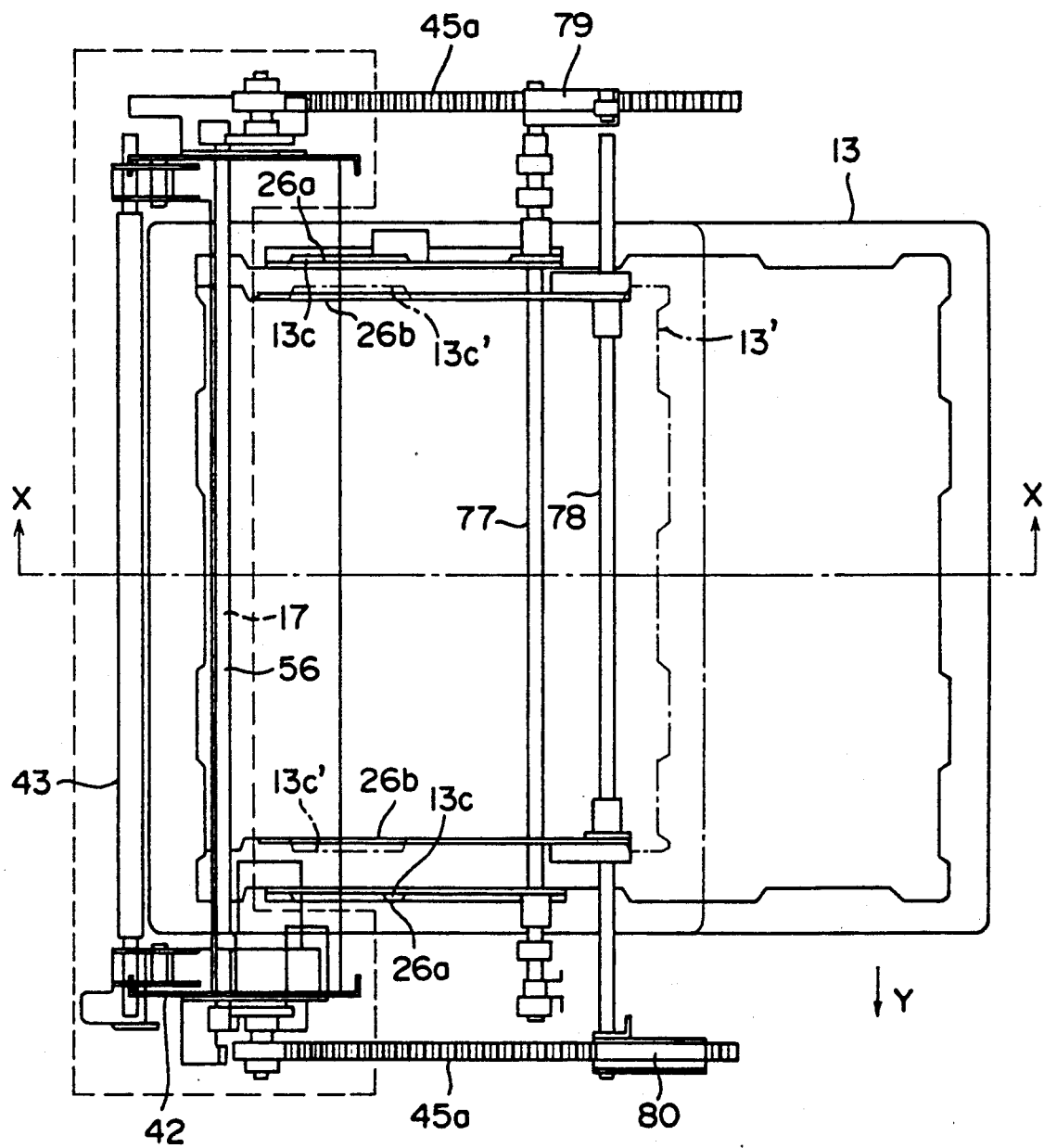
FIG. 11 is a plan view of the cover sticking/removing device.
Figure 12:
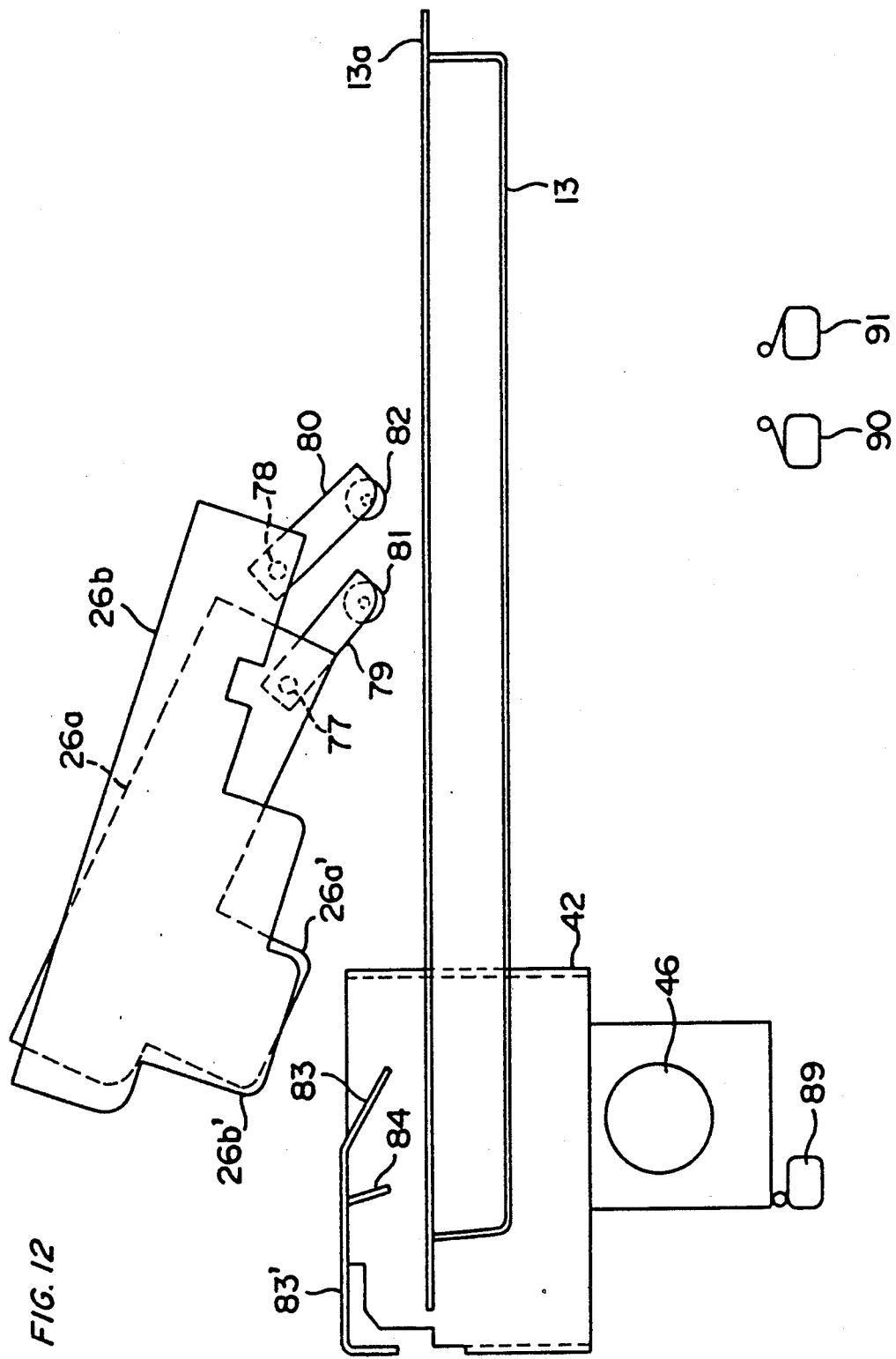
FIG. 12, 13 and 14 are views of film guide plates, which views show the motion of the guide plates.
Figure 13:
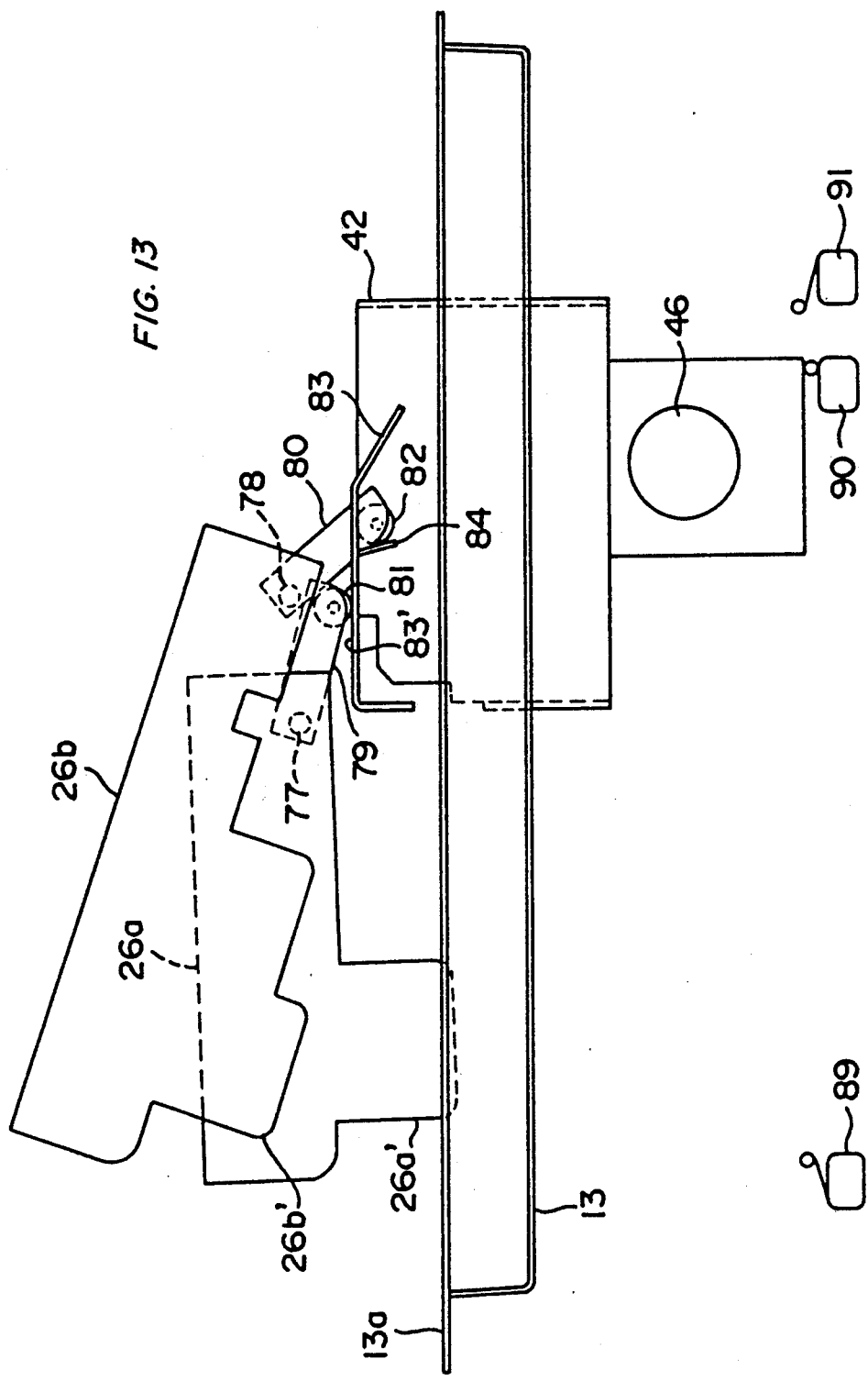
Figure 14:
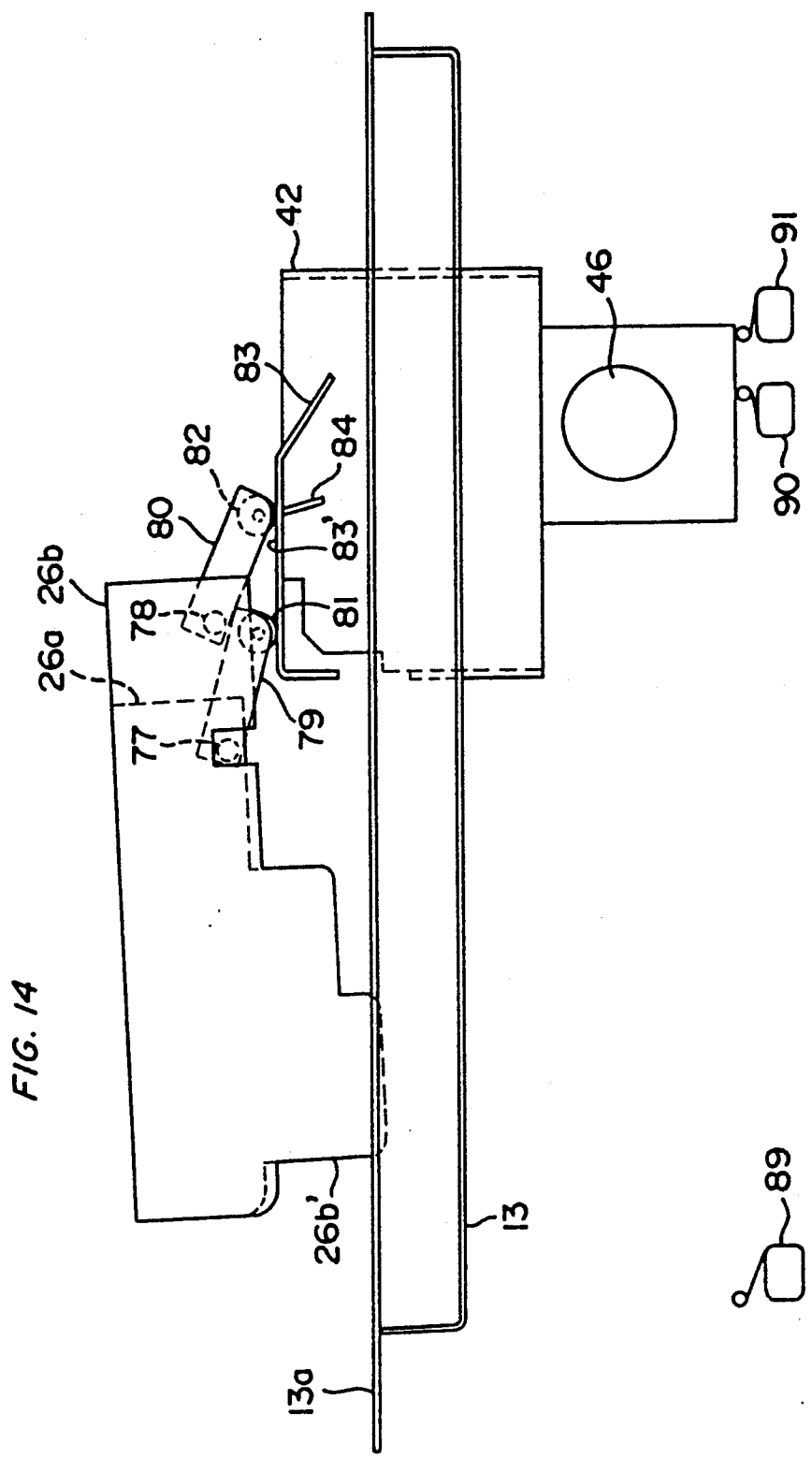

FIG. 11 is a plan view of the magazine 13 and the parts thereof. FIGS. 12, 13 and 14 are sectional views crossed along the line X-X in FIG. 11. A pair of film guide plates 26 for regulating a sucked film in relation plates 26b for a smaller size are fitted to shafts 77 and 78, which are supported by the frame (not shown) of the printer 10, respectively. The guide plates 26a and 26b are capable of pivoting on the respective shafts 77 and 78 between a retreat position and a guide position. With this arrangement, the plates 26a and 26b do not obstruct the setting of the magazine 13 where a larger size of films are stored or a magazine 13' where a smaller size of films are stored, that is, the drawing of the base table 40 in the direction indicated by arrow Y in FIG 11. Pairs of legs 79 and 80 are pivoted on the respective shafts 77 and 78 at the ends, and each of the legs 79 and 80 has a roller 81 or 82 at the free end.

FIG. 12 shows a state where the cover winding section is in the initial position and the film guide plates 26a and 26b are in the retreat position. A sensor 89 for detecting whether the frame 42 is in the initial position is disposed below the left edge of the magazine 13. While the bottom of the frame 42 is in contact with the sensor 89, it is judged that the frame 42 is in the initial position. A film cover winding operation starts at this initial Position, and as the winding section is moving to the right in FIG. 12, the film cover 41 is wound around the winding shaft 17. Referring to FIG. 13, immediately before the bottom of the frame 42 comes into contact with a sensor 90, each of the guide plates 26a with the leg 79 climbs a slope 83 of the frame 42 using the roller 81 and comes onto a plane 83'. Thereafter, the edge of a tab 26a' of each of the film guide plates 26a comes into a groove 13c made in the inner wall of the magazine 13, and thus the guide plates 26a come to the guide position.

When the magazine 13' for a smaller size is mounted, as shown in FIG. 14, each of the guide plates 26b with the leg 80 climbs a slope 84 of the frame 42 using the roller 82 and comes onto a plane 84'. The edge of a tab 26b' of each of the guide plates 26b comes into a groove 13c' made in the inner wall of the magazine 13', and thus the guide plates 26b are set to the guide position. At the same time, the sensor 90 and a sensor 91 are turned on, which means the frame 42 reaches the wind-up position The inner surface of each of the guide plates 26a and 26b is covered with a sheet made of elastic and smooth material such as polyester. The guide plates 26a and 26b prevent each sucked film from skewing. Also, when the suckers 21a, 21b and 21c suck more than one film, the guide plates 26a and 26b guide the films other than the topmost film to fall down to the former place exactly in this embodiment, pairs of guide plates 26a and 26b are provided in accordance with the sizes of films. However, when a guide plate which is commonly used for guiding films of all the sizes is provided, only a single guide plate, not a pair, is further necessary to guide each size of films.

The following description is of sensors provided in the printer 10 to detect film transport trouble As described above, a film is fed out of the magazine 13 to the transport rollers 25 by the film feeder 14 and then transported to the film transport unit 15 by the rollers 25. The sensor 85 is incorporated in the holder 69 of the upper transport roller 25a (the actuator of the sensor 85 is shown in FIG. 8), and when the upper roller 25a moves down to the lower roller 25b, the actuator comes to the upstream side of the nip portion of the transport rollers 25 (the right side of the rollers 25 in FIG. 8). In this position, the sensor 85 detects whether there are any films between the transport rollers 25. The sensor S1 is disposed on the reverse side of the guide plate 29 in the transport unit 15, upstream of the stopper 32. The sensor S1 extends an actuator into a film path along the guide plate 29 through an opening formed on the plate 29 to detect whether there are any films in the path. The sensor S3 is provided on the reverse side of a lower guide plate of a film path between the sub-scan unit 18 and the receive magazine 19, and the sensor S3 extends an actuator into the path through an opening formed on the guide plate to detect whether a film has been transported to the receive magazine 19.

Figure 15:
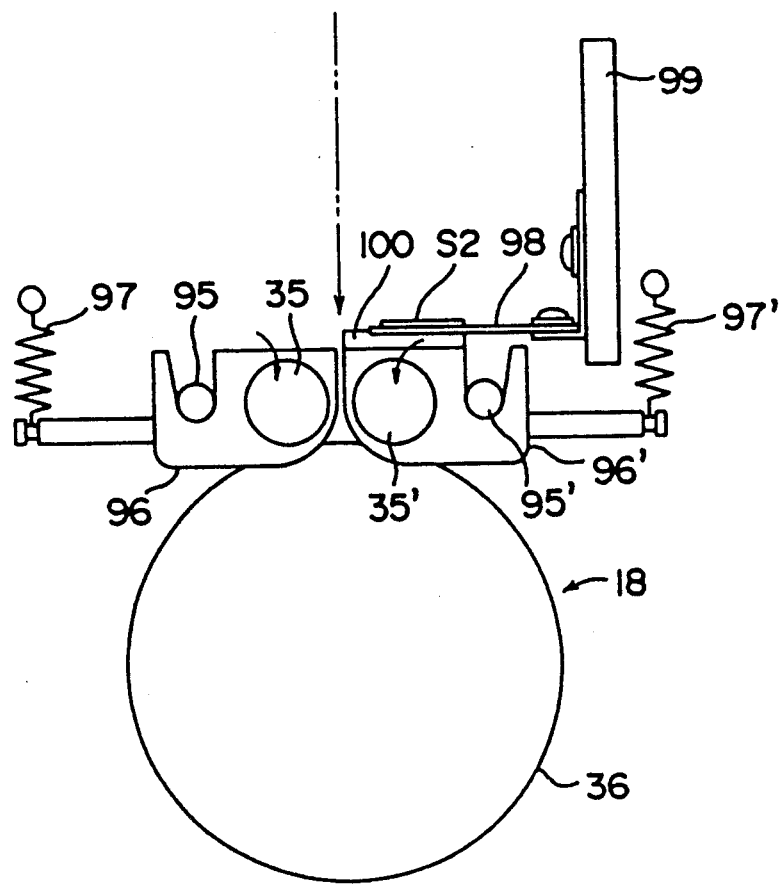
FIG. 15 is a side view of a sub-scan unit.
Figure 16:
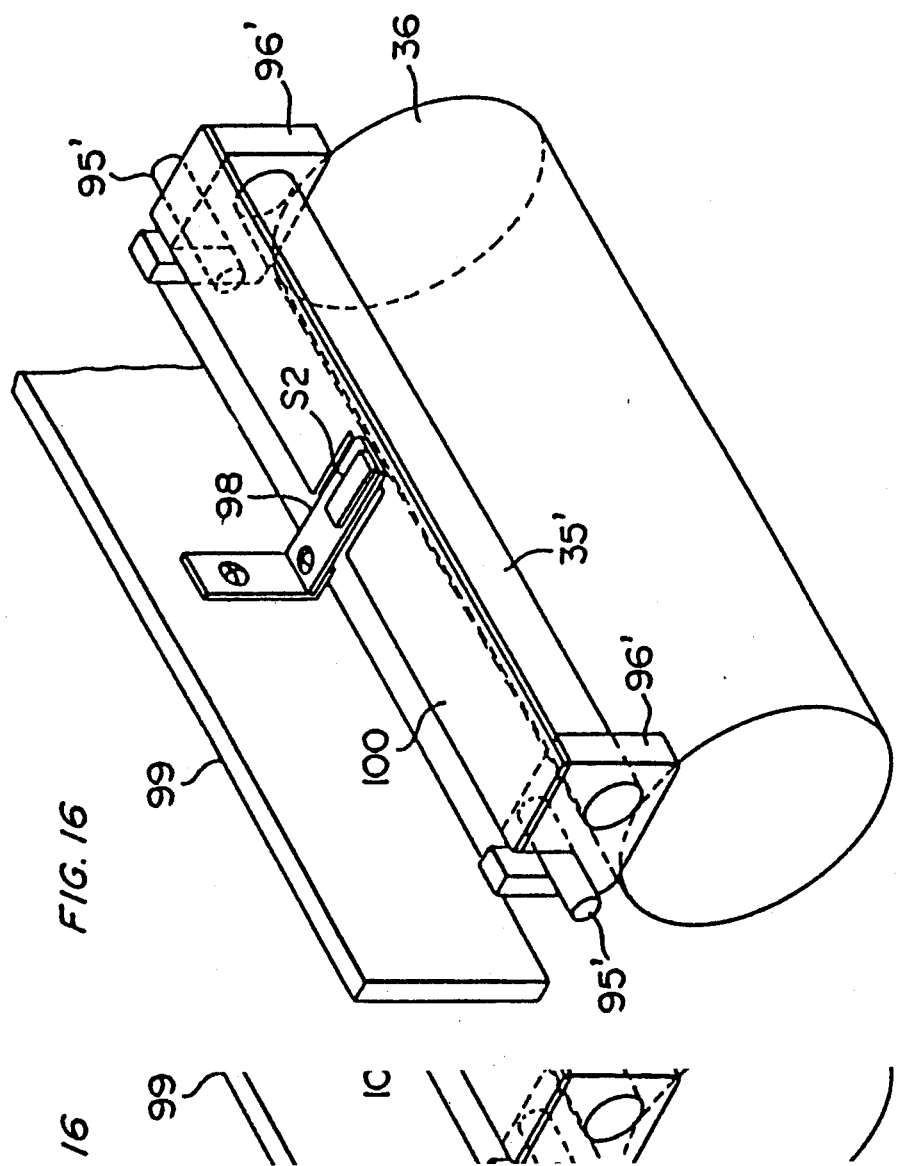
FIG. 16 is a perspective view of the sub-scan unit.

FIGS. 15 and 16 are a side view and a perspective view of the principal part of the sub-scan unit 18. The rollers 35 and 35' disposed against the sub-scan drum 36 are rotatably supported by pairs of holders 96 and 96' respectively. Each of the holders 96 is supported by a shaft 95, and a spring 97 pulls each of the shafts 95 so that the roller 35 is pushed against the sub-scan drum 36 as indicated by the arrow in FIG. 15. In the same manner, the other roller 35' is pushed against the sub-scan drum 36 by the force of springs 97' connected with the respective holders 96' supported by the respective shafts 95'. A plate 100 is laid between the pair of holders 96', and a mounting plate 98 is provided to connect the plate 100 and a frame 99 of the printer 10. The sensor S2, which is a strain gage type, is fixed on the mounting plate 100. When (a) film(s) come(s) between the roller 35' and the sub-scan drum 36, the holders 96' pivot upward because of the thickness of the film(s), which motion subsequently becomes a strain on the mounting plate 100. The strain is measured by the sensor S2, and thus it is detected whether there are any films between the roller 35' and the sub-scan drum 36.

Figure 18:
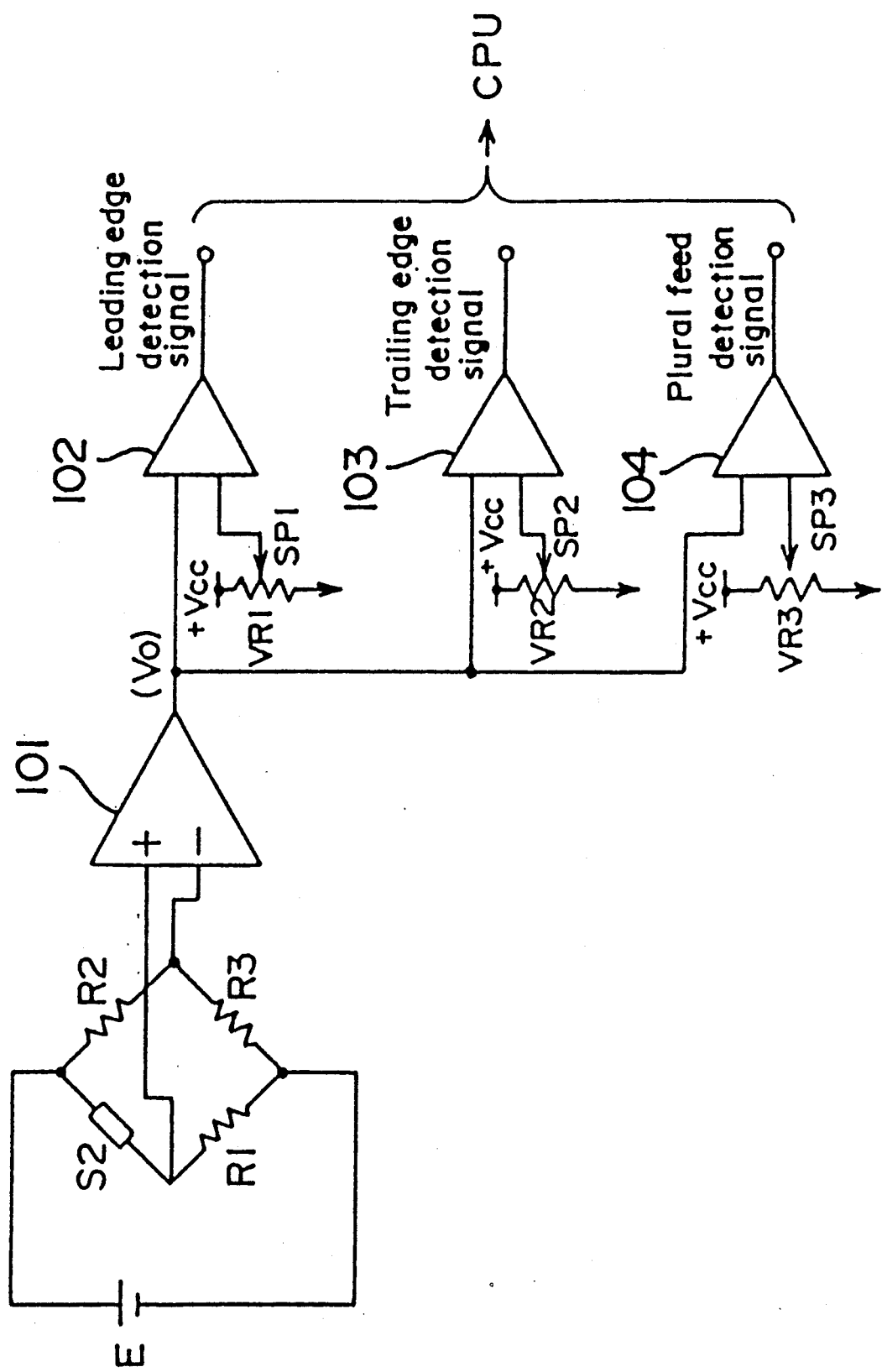
FIG. 18 is a block diagram showing a circuit for measuring the thickness of (a) film(s) with the strain sensor.

FIG. 18 is a processing circuit with use of the strain type sensor S2. The sensor S2 and resistors R1, R2 and R3 which have the same resistance as the sensor S2 are made into a bridge circuit. A power source E is connected to the node between the sensor S2 and the resistor R2, and the node between the resistor R2 and the resistor R3. The node between the sensor S2 and the resistor R1 is connected to the positive terminal of a differential amplifier 101, and the node between the resistors R2 and R3 is connected to the negative terminal of the differential amplifier 101. The output terminal of the differential amplifier 101 is connected to comparators 102, 103 and 104 through the respective input terminals. The other input terminals of the comparators 102, 103 and 104 are impressed with voltages VR1, VR2 and VR3, which are diversified from a voltage of +Vcc by resistors SP1, SP2 and SP3, respectively. Outputs of the comparators 102, 103 and 104 are transmitted to a CPU as a leading edge detection signal, a trailing edge detection signal and a plural feed detection signal respectively.

Figure 17:
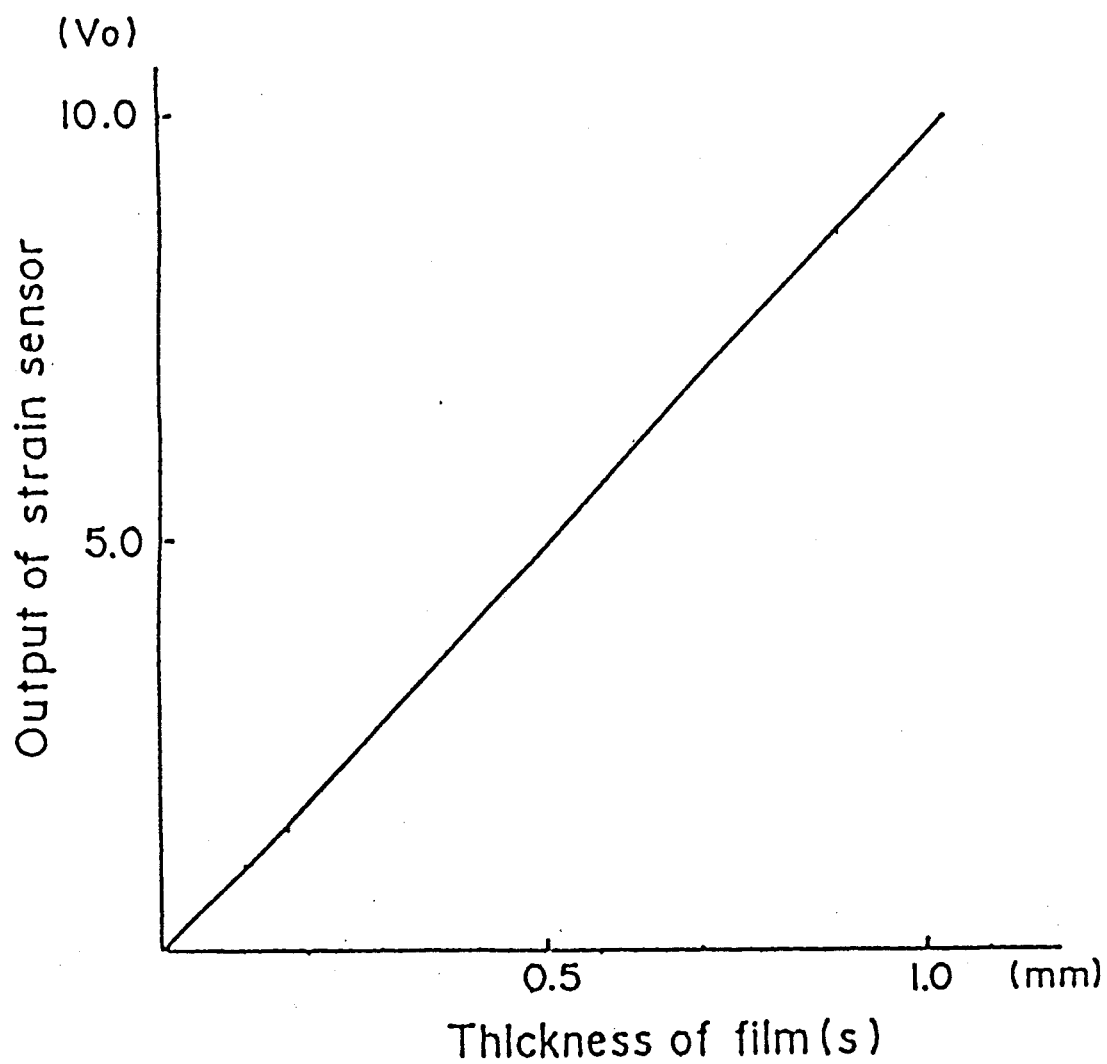
FIG. 17 is a graph showing a correlation between the thickness of (a) film(s) and the output of a strain type sensor.

Because a photosensor is not useful for detecting Photosensitive films, a strain type of sensor is adopted in this embodiment to detect whether more than one film is transported at a time. Also, in a system using a photosensor for measuring the displacement of the roller 35', it is impossible to show the correlation between the output of the photosensor and the thickness of the film(s) between the roller 35' and the sub-scan drum 36 as a line. On the other hand, with use of a strain type sensor, the correlation between the output of the sensor and the thickness of the film(s) is represented by a line as shown in FIG. 17.

Figure 19:
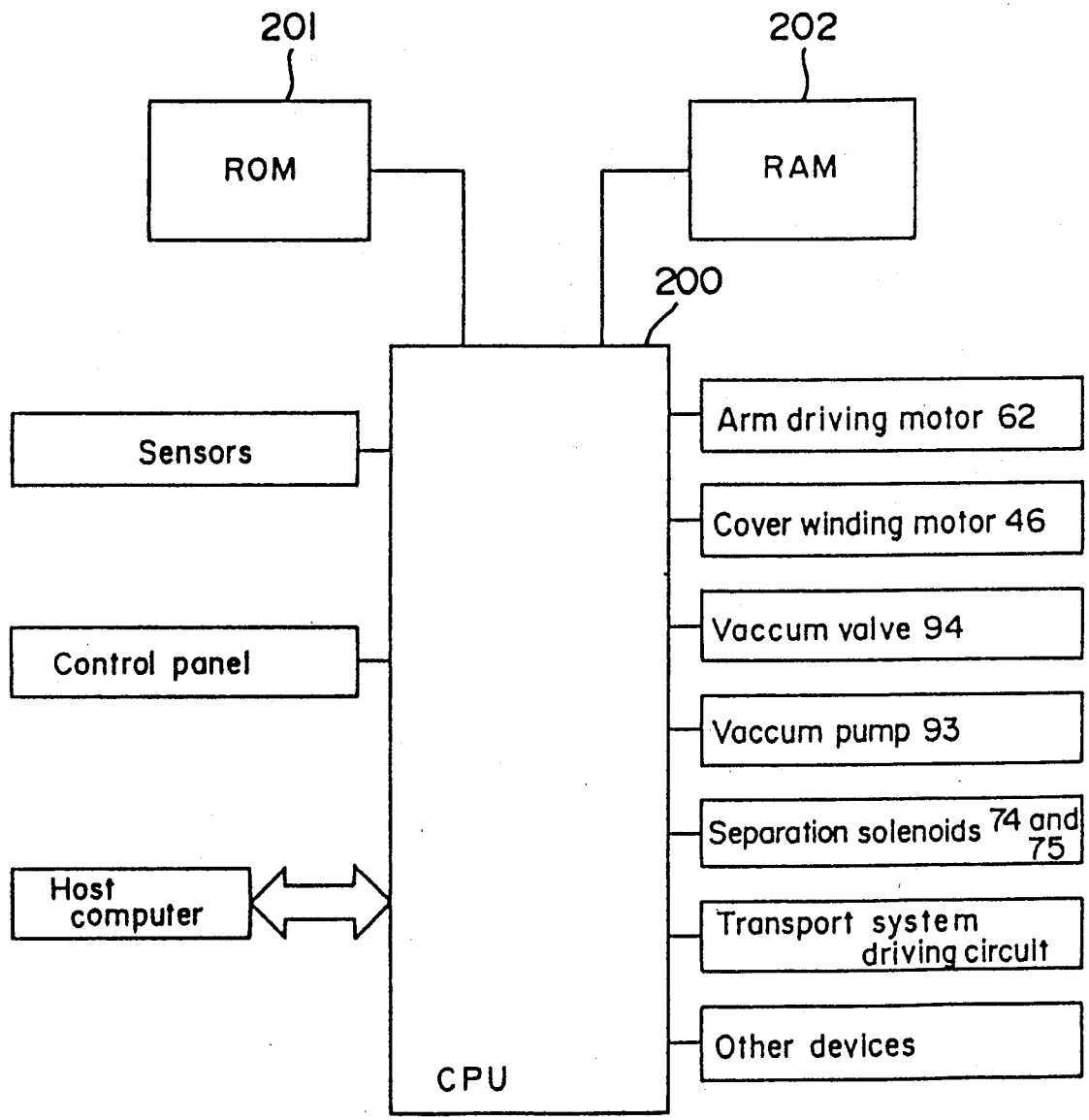
FIG. 19 is a block diagram showing a control circuitry.

FIG. 19 shows a control circuitry for the printer 10. The center of this control circuitry is a central processing unit (CPU) 200 incorporating a read only memory (ROM) 201 and a random access memory (RAM) 202 therein. The CPU 200 communicates with the host computer. Signals from every sensor, every switch, etc. are transmitted to the CPU 200, and signals are sent from the CPU 200 to the arm driving motor 62, the cover winding motor 46, indicators on a control panel (not shown), etc.

The operation of the printer 10 is hereinafter described in reference with flowcharts shown in FIGS. 20 through 32.

Figure 20:
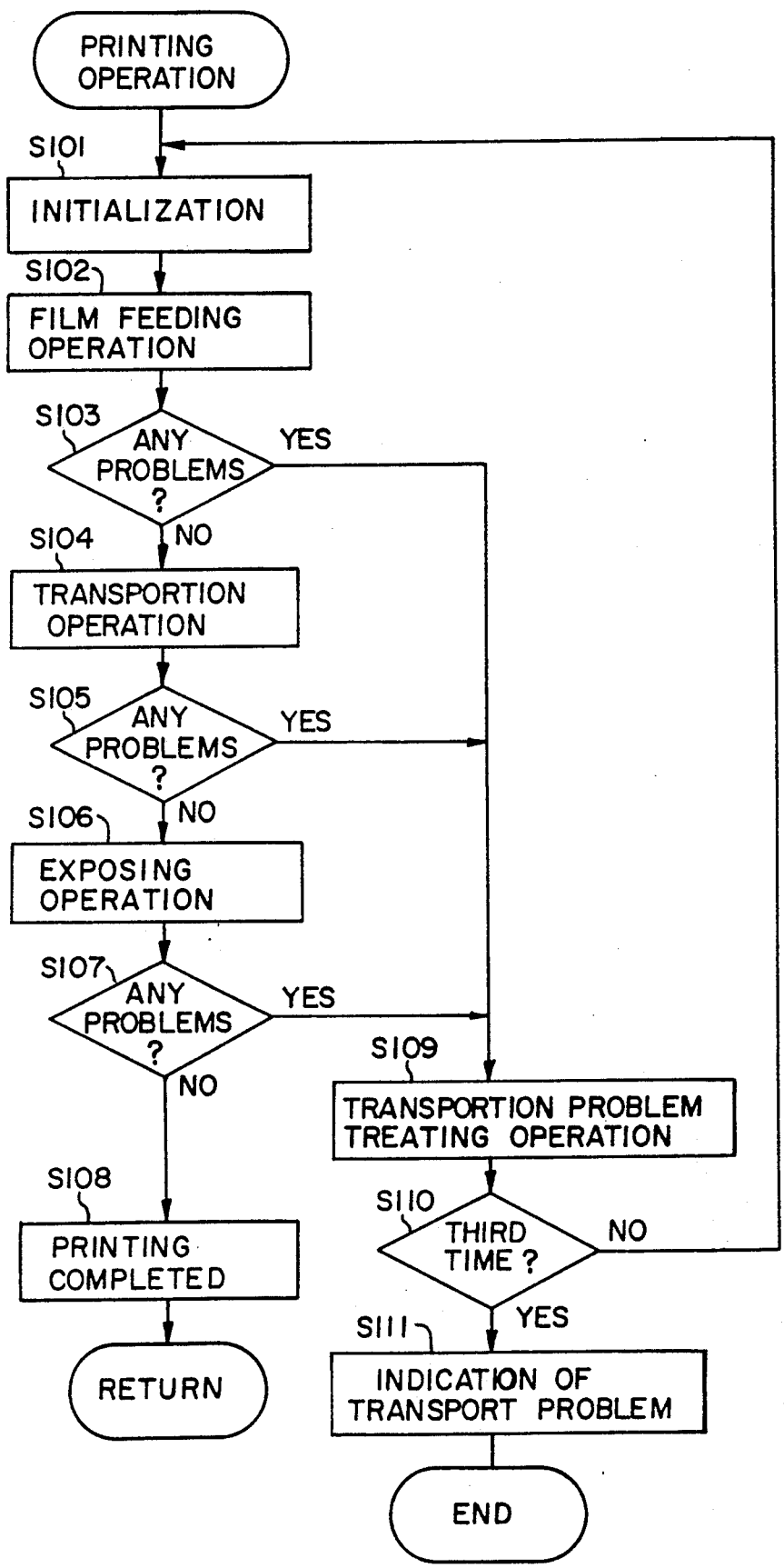
FIG. 20 is a flowchart showing a general procedure of performing a printing operation.

First a general procedure of performing a printing operation is described referring to FIG. 20. A printing operation starts in response to either a print signal transmitted from the host machine 1 or a signal generated by pressing a print switch on the control panel (not shown) mounted on the printer 10.

First, at step S101 initialization for a printing operation is carried out. The initialization includes warming up the optical unit 16, turning on the vacuum pump 93, moving the upper transport roller 25a upward, moving the film stopper 32 in the transport unit 15 downward, resetting every flag, turning off every indication on the control panel which indication is related to film transport trouble, turning on a sub-scan motor to rotate the sub-scan drum 36 in the sub-scan unit 18.

Figure 21:
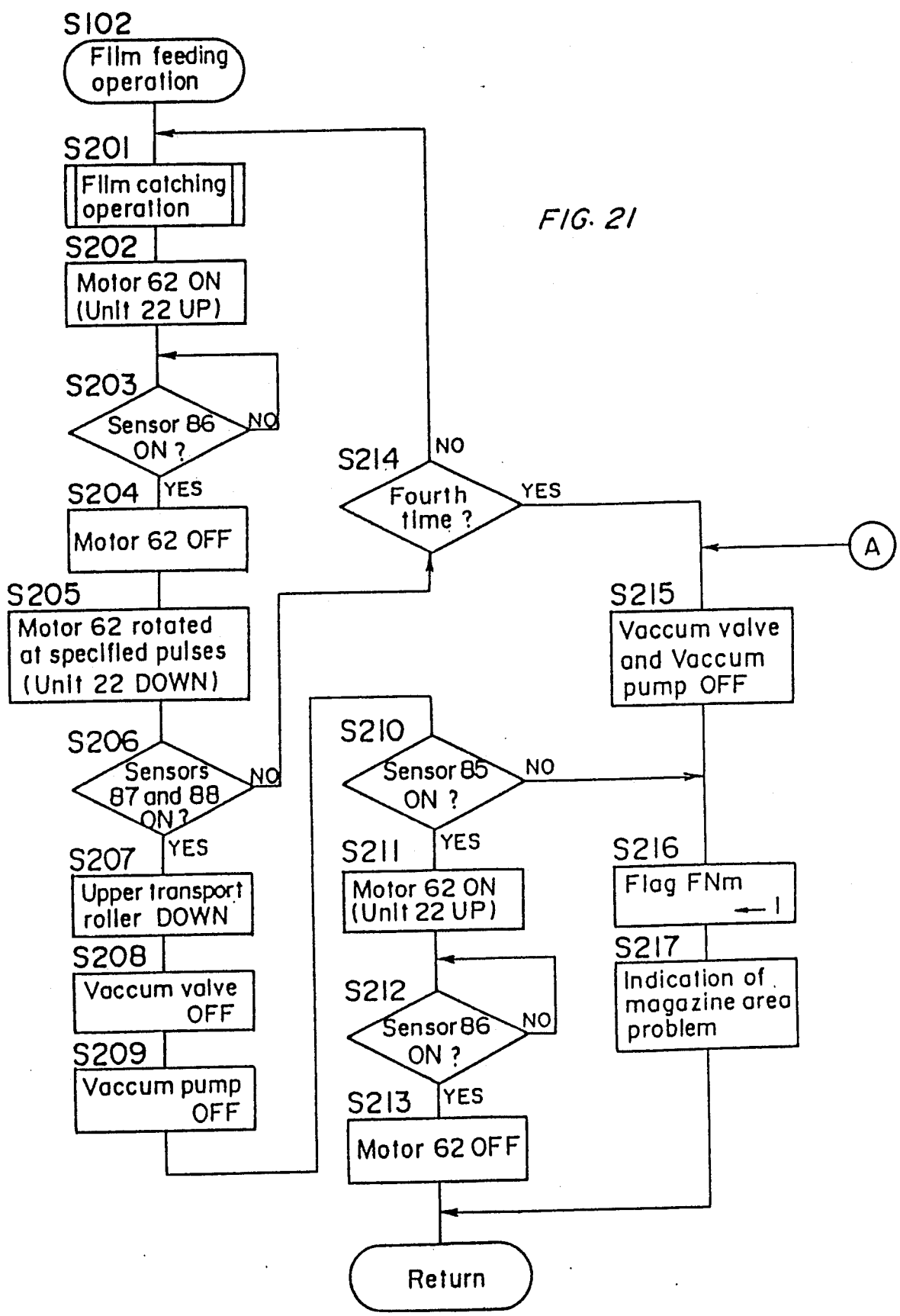
FIG. 21 is a flowchart showing a procedure of performing a film feeding operation.

Step S102 is a process of feeding a film from the magazine 13 which is illustrated in detail in FIG. 21. Step 103 is a process of judging whether a problem takes place deriving from the film feed performed at step S102. When there are no problems, the processing goes to step S104 where the film is further transported, which process is illustrated in detail in FIG. 24. Thereafter it is judged at step S105 whether a problem takes place. When there are no problems, the processing goes to step S106 to expose the film, which process is illustrated in detail in FIGS. 25a and 25b. Then it is judged again at step S107 whether a problem takes place. When there are no problems, the printing operation comes to an end, and the printer 10 comes in a waiting condition at step S108.

Figure 26:
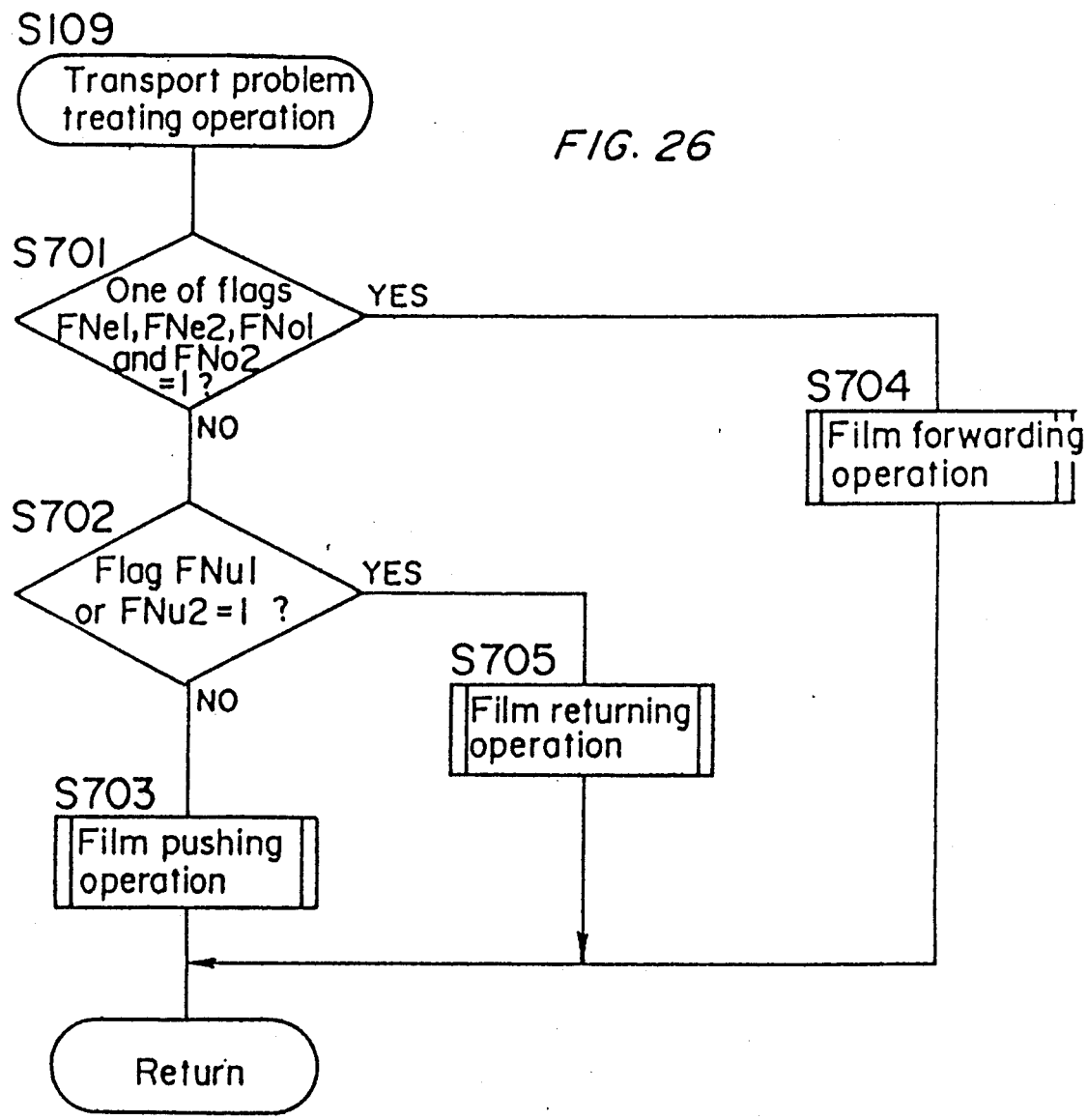
FIG. 26 is a flowchart showing a procedure of performing a transport problem treating operation.

When it is judged at step S103, S105 or S107 that a problem has occurred, the processing goes to step S109 to treat the problem, which process is illustrated in detail in FIG. 26. After the problem treating operation, it is judged at step S110 whether the problem treating operation has been repeated more than two times. When the operation has been carried out either once or twice, the processing returns to step S101 to resume the printing operation. In order to resume the printing operation, a signal representing a recovery of the printer 10 from a problem is automatically transmitted to the host machine 1, and the host machine 1 starts to send the printer 10 the data from the beginning on the image which was going to be printed. However, when a problem is detected at every step of S103, S105 and S107, that is, when three film transport problems are detected during an operation for printing a single image on a single film, the control panel indicates film transport trouble at step S111 even if the printer 10 has recovered from the problems. Thus the printing operation comes to an end. When film transport problems occur so often as three times during an operation for printing a single image on a single film, there may be something wrong with the film transport system of the printer 10, and the operator should check inside of the printer 10. That is why the control panel indicates film transport trouble although the jammed film has been removed from the film path.

Further, the printer 10 and the host machine 1 may be so constructed that the Printer 10 sends a signal to the host machine 1 only when the printer 10 can not automatically recover from a problem and that the process of automatically recovering from the problem and resuming the printing operation is carried out inside the printer 10. More specifically, the printer 10 is provided with a memory storage in which data on a least one image is stored so that the data are taken out of the storage from the beginning after a recovery of the printer 10 from a problem.

Now referring to FIG. 21, the operation of feeding a film from the magazine 13 is described. First, a film is caught by the suckers 21a, 21b and 21c at step S201 following a procedure described in FIGS. 22a and 22b, and the arm driving motor 62 is driven at step S202 to raise the sucker holding unit 22. When the sensor 86 is turned on at step S203, which means that the sucker holding unit 22 reaches the highest position, the sucker holding unit 22 is stopped at step S204. Next, at step S205 the arm driving motor 62 is rotated by a specified number of pulses to put the sucker holding unit 22 in the film feeding position indicated by the chain line in FIG. 8. Subsequently it is checked at step S206 whether both the sensors 87 and 88 are on, that is, whether a film is firmly caught by the suckers 21a, 21b and 21c. The film may fall down before being inserted between the transport rollers 25. In this case, the result at step S206 is "NO", and the processing returns to step S201. When it is judged at step S206 that the sensors 87 and 88 are both on, the solenoid 68 is turned on at step S207 to move the upper transport roller 25a downward. Thereby, the film is nipped between the rollers 25a and 25b. Then, the vacuum valve 94 and the vacuum pump 93 are turned off at steps S208 and S209 respectively to stop the suckers 21a, 21b and 21c from sucking. Thereafter it is judged at step S210 whether the film is certainly nipped between the rollers 25a and 25b from the on/off state of the sensor 85. When the sensor 85 is on, that is, when the film is certainly nipped between the rollers 25a and 25b, the arm driving motor 62 is rotated at step S211 to raise the sucker holding unit 22. When it is judged at step S212 from the on state of the sensor 86 that the sucker holding unit 22 reaches the highest position, the arm driving motor 62 is turned off at step S213, and thus the film feed operation is completed.

The steps from S201 to S205 are repeated at most four times until it is judged at step S206 that both the sensors 87 and 88 are on. When it is not judged at step S206 that both the sensors 87 and 88 are on though the steps from S201 to S205 have been repeated four times, the vacuum valve 94 and the vacuum pump 93 are turned off at step S215. Then, a flag FNm representing that a film transport problem takes place in a magazine area is set to "1" at step S216, and an indication panel of the printer 10 indicates at step S217 that a problem has occurred in the magazine area. When it is judged at step S210 that the film is not nipped between the rollers 25 certainly, the processing goes to steps S216 and S217 to indicate a problem in the magazine area likewise.

Figure 22A:
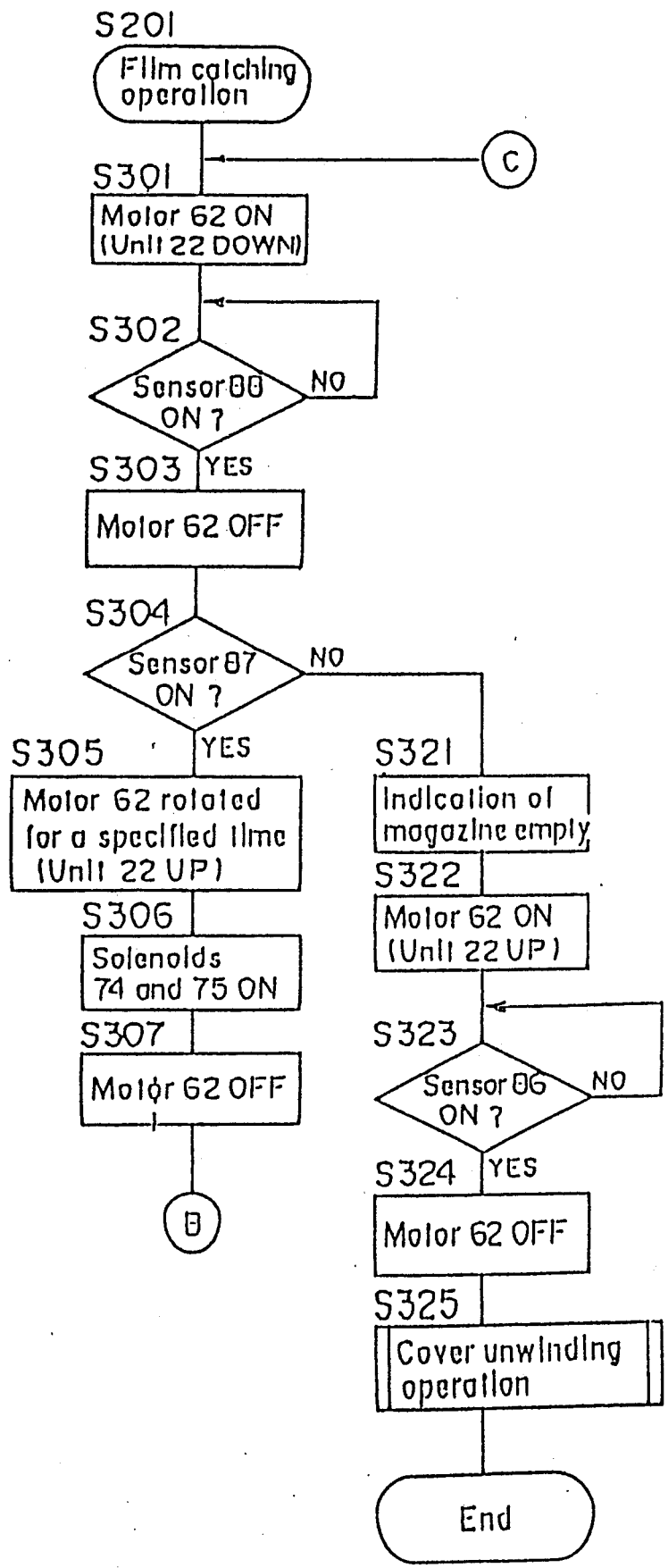
FIGS. 22a and 22b are flowcharts showing a procedure of performing a film catching operation.
Figure 22B:
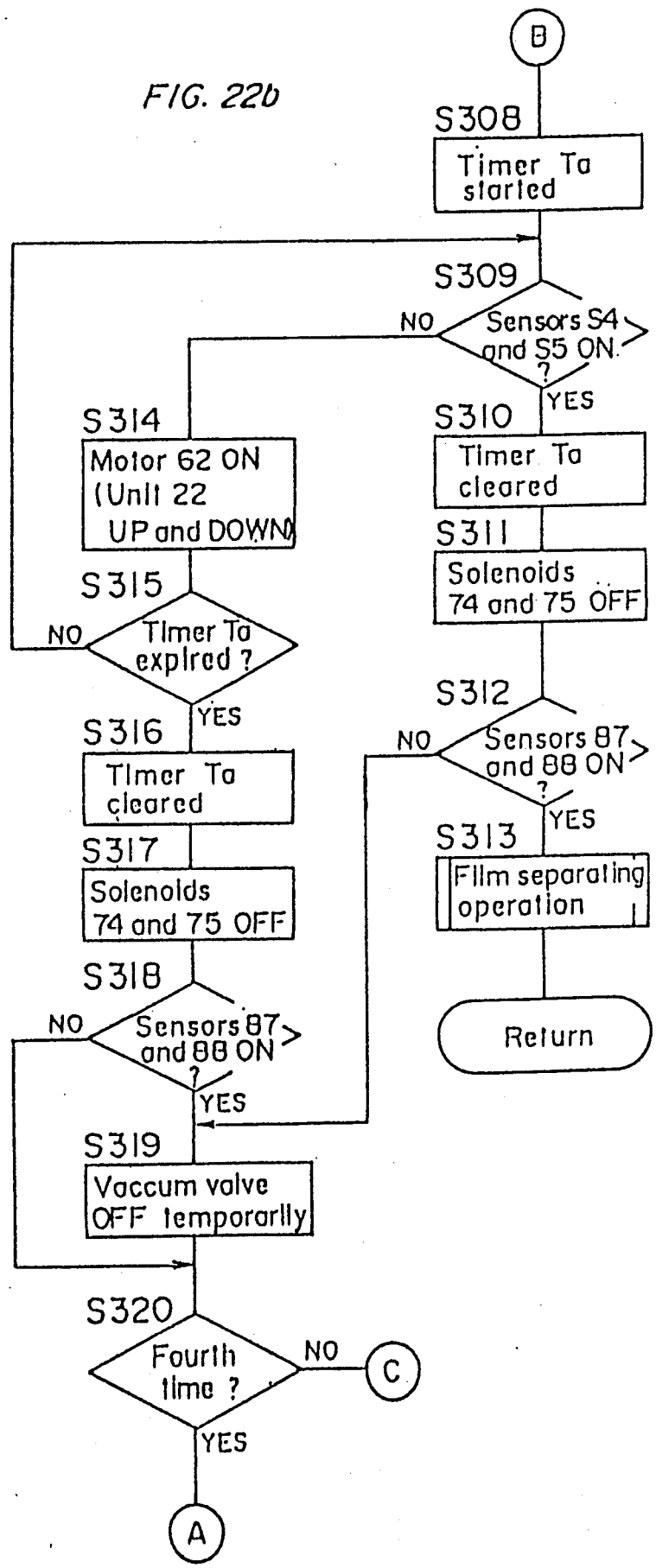

Referring to FIGS. 22a and 22b, a process of catching a film with use of the suckers 21a, 21b and 21c is described. This process is a step in a film feeding operation (see step S201 in FIG. 21).

First, the arm driving motor 62 is rotated at step S301 to activate the gears 63 through 67 and move the sucker holding unit 22 downward. It is judged at step S302 from the on/off state of the sensor 88 whether the suckers 21a 21b and 21c come into contact with the uppermost film of the film stack 20 in the magazine 13. When the sensor 88 is turned on, the motor 62 is turned off at step S303 so that the sucker holding unit 22 comes to a standstill in a state where the suckers 21a, 21b and 21c are in contact with the uppermost film.

Further, there is a possibility that no films exist in the magazine 13. It is judged at step S304 from the on/off state of the sensor 87 whether there are any films in the magazine 13. When the sensor 87 is on, there is(are) (a) film(s) in the magazine 13, and the topmost film is going to be caught by the suckers 21a, 21b and 21c. Because the vacuum pump 93 and the vacuum valve 94 were turned on at step S101 (see FIG. 20), the pump 93 and the valve 94 are in operation at that time.

When the sensor 87 is not turned on at step S304, there are no films in the magazine 13, and the indication panel warns at step S321 that the magazine 13 is emptied of films. Then, the arm driving motor 62 is rotated at step S322 to move the sucker holding unit 22 upward. When it is judged at step S323 that the sensor 86 is on, that is, when the sucker holding unit 22 reaches the highest position, the motor 62 is stopped at step S324. Then, the processing goes to a process of unwinding the cover 41 (see step S325) which process is illustrated in detail in FIG. 30. After the cover unwinding operation, it becomes possible to change magazines. In the state, all the sections of the printer 10 run down except for the indication section.

When the sensor 87 is turned on at step S304, the arm driving motor 62 is rotated for a specified time at step S305 to raise the sucker holding unit 22. While the sucker holding unit 22 is moving upward, the solenoids 74 and 75 are turned on at step S306 to move the suckers 21a and 21c toward the middle sucker 21b. When the specified time elapses, the motor 62 is turned off at step S307 to stop the sucker holding unit 22. Subsequently a timer Ta is started at step S308, and it is judged at step S309 whether the sensors S4 and S5 are turned on in response to turning on the solenoids 74 and 75. This judgment is made here in order to estimate whether a film separating operation which is supposed to be performed at step S313 will be possible. When the result of the judgment at step S309 is "NO", it is considered that films held by the suckers 21a, 21b and 21c are so many and so stiff that the suckers 21a and 21c can not reach the respective sensors S4 and S5 although the solenoids 74 and 75 have been turned on, in which case the film separating operation will be impossible.

Hence, in this case the processing goes to step S314 to perform a preliminary separating operation. Specifically, the arm driving motor 62 is driven to vertically reciprocate the sucker holding unit 22 once so that some of the sucked films will fall down. When it is judged at step S315 that the time set in the timer Ta has not expired, the processing returns to step 8309 to judge whether the sensors S4 and S5 have been turned on. When the sensors S4 and S5 are not on, the preliminary separating operation is repeated and thereafter the sensors S4 and S5 are checked again as long as the time has not expired.

When it is judged at step S315 that the time set in the timer Ta has expired, which means that many films are still held by the suckers 21a, 21b and 21c although the preliminary separating operation has been repeated, the film feeder 14 prepares to perform the film catching operation again from the beginning. More specifically, the timer Ta is cleared at step S316, and the solenoids 74 and 75 are turned off at step S317 to return the Plates 72 and 73 to the initial position. When the sensors 87 and 88 are on in this state ("YES" at step S318), that is, when the suckers 21a, 21b and 21c still held the films, the vacuum valve 94 is turned off temporarily at step S319 to drop the films into the magazine 13. The film catching operation is tried at most four times, and when the fourth trial ends in failure ("YES" at step S320), the processing goes to step S215 shown in FIG. 21 to discontinue the film catching operation. Then, the flag FNm representing that there is a film transport problem in the magazine area is set to "1" (see step S216).

When it is judged at step S309 that the sensors S4 and S5 have been turned on, the timer Ta is cleared at step S310, and the solenoids 74 and 75 are turned off at step S311 to return the plates 72 and 73 to the initial position. Next, it is judged at step S312 from the on/off state of the sensors 87 and 88 whether the film(s) is(are) firmly held by the suckers 21a, 21b and 21c. The reason why the judgment is made here is there is a possibility that the uppermost film as well as the succeeding films may fall down or that the suction of the uppermost film by the suckers 21a, 21b and 21c may be impaired during the preliminary separating operation. When it is judged that the uppermost film is not firmly held by the suckers 21a, 21b and 21c, the processing goes to step S319 where the vacuum valve 94 is turned off temporarily so that the film(s) fall(s) down. Then, the processing returns to step S301 unless it is the fourth trial. When it is judged at step S312 that the uppermost film is firmly held by the suckers 21a, 21b and 21c, the processing goes to step S313 to perform a regular separating operation. The film catching operation is completed with the regular separating operation, which is illustrated in detail in FIG. 23.

The preliminary separating operation, which is carried out at step S314 shown in FIG. 22b if necessary, is reciprocating the sucker holding unit 22 to shake some of the films from the suckers 21a, 21b and 21c. The regular separating operation, on the other hand, is moving the suckers 21a and 21c toward the middle sucker 21b to wave the uppermost film so that the succeeding films separate from the uppermost film and fall down. In other words, when the suckers 21a, 21b and 21c suck up too many films at a time, the preliminary separating operation is performed in order to shake some of the films from the suckers 21a, 21b and 21c. After the number of films held by the suckers 21a, 21b and 21c was thus decreased, the regular separating operation is performed in order to drop all the films other than the uppermost film back into the magazine 13.

There are two manners of performing the regular separating operation. One of them is moving the suckers 21a and 21c toward the sucker 21b simultaneously. Since the interval a between the suckers 21a and 21b is larger than the interval b between the suckers 21b and 21c (see FIG. 9), the wave made by the motion of the sucker 21a is different from the wave made by the motion of the sucker 21c. The waves having different lengths interact and certainly produce a gap between the waving uppermost film and the succeeding films. Thus, the succeeding films certainly separate from the uppermost film and fall down into the magazine 13.

The other is oscillating the plates 72 and 73 with a time lag, that is, moving the suckers 21a and 21c toward the sucker 21b with a time lag. In this manner, waves are made around the suckers 21a and 21c with a time lag, thereby certainly producing a gap between the uppermost film and the succeeding films.

Although both of the manners are adopted in this embodiment in order to make the separating operation more effective, the two manners may be adopted independently. For example, the suckers 21a, 21b and 21c are supported by the sucker holding unit 22 at uniform intervals, and the suckers 21a and 21c are moved with a time lag in the regular separating operation (the latter manner is adopted).

Figure 23:
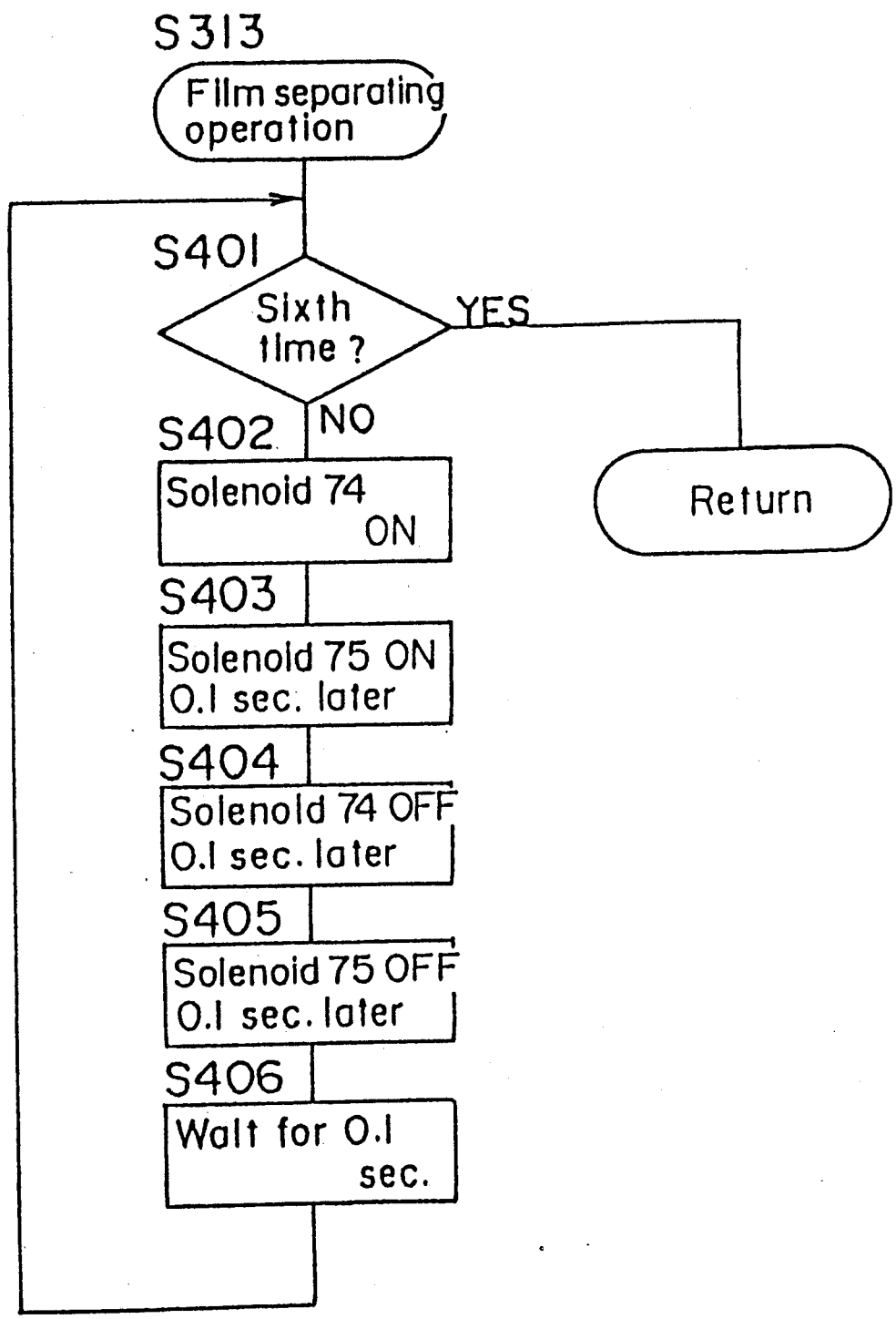
FIG. 23 is a flowchart showing a procedure of performing a film separating operation.

Now referring to FIG. 23, a procedure of carrying out the regular separating operation is described.

First, it is figured out at step S401 how many times the regular separating operation has been repeated. When the regular separating operation has been repeated less than five times, the processing goes to step S402 where the solenoid 74 is turned on to move the sucker 21a. 0.1 second after turning on the solenoid 74, the solenoid 74 is turned on at step S403 to move the sucker 21c. 0.1 second later, the solenoid 74 is turned off at step S404, and another 0.1 second later, the solenoid 75 is turned off at step S405. The processing waits for 0.1 second at step S406, and returns to step S401. This procedure is repeated five times, and when the processing comes to step S401 for the sixth time, the regular separating operation is completed.

Further, in order to perform the regular separating operation in the former of the above-described two manners, the solenoids 74 and 75 are to be turned on and off simultaneously.

Figure 24:
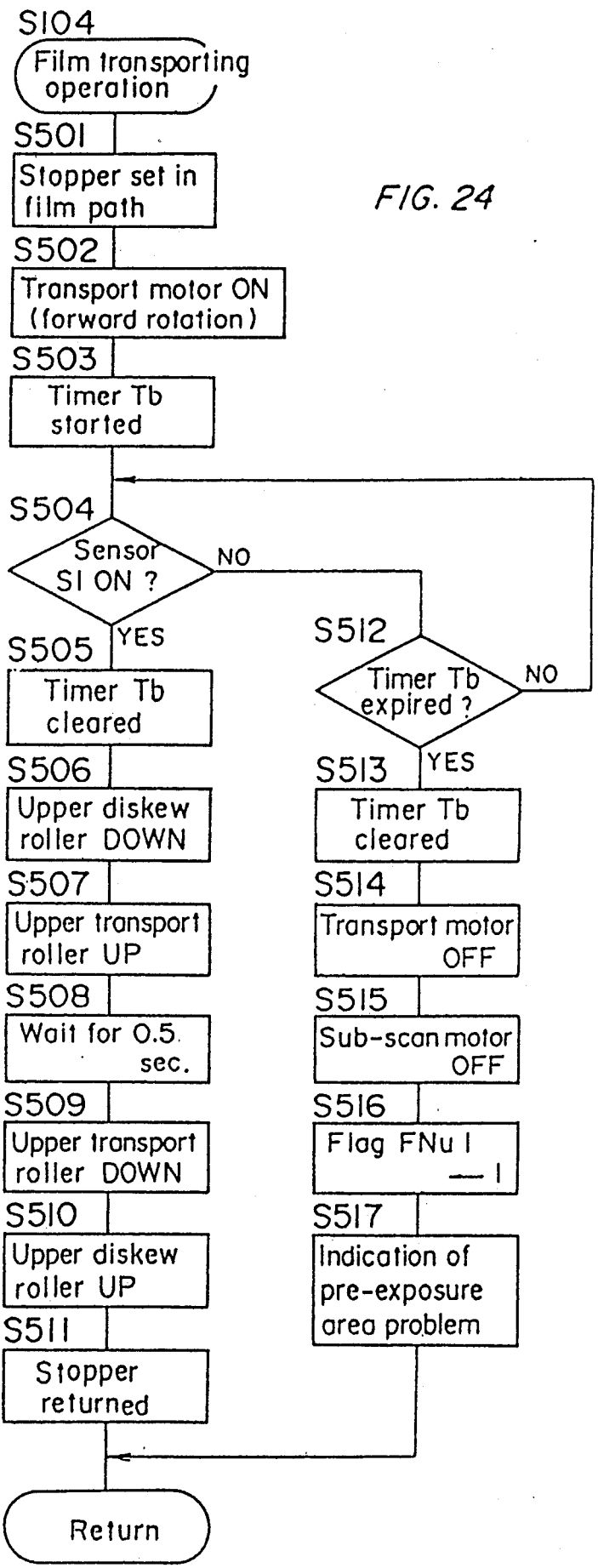
FIG. 24 is a flowchart showing a procedure of performing a film transporting operation.

Now referring to FIG. 24, the film transport operation, which is carried out at step S104 of the flowchart shown in FIG. 20, is described. In this process, a film fed between the transport rollers 25 by the film feeder 14 is transported through the transport unit 15 to a place immediately before the sub-scan unit 18.

First, the stopper 32 is set in the film path at step S501. Subsequently the transport motor is turned on at step S502 to rotate the lower transport roller 25b so that the film stuck between the transport rollers 25a and 25b moves toward the sub-scan unit 18. At step S503 a timer Tb is started, and it is judged at step S504 whether the sensor S1 is turned on within a specified time In other words, it is judged whether the film is transported into the film path without any problems. When the film sensor S1 is turned on within the specified time, which means that the film is transported into the film path smoothly, the timer Tb is cleared at step S505. Then, the upper roller of the diskew rollers 30 is moved downward at step S506, and the solenoid 68 is turned on at step S507 to move the upper transport roller 25a upward. While the upper roller 25a recedes from the lower roller 25b for 0.5 seconds (step S508), the film provided with a force by the diskew rollers 30 contacts with the stopper 32 so that the film is diskewed. Thereafter, the solenoid 68 is turned on at step S509 to move the upper transport roller 25a downward, and the upper roller of the diskew rollers 30 is moved upward at step S510. In this state, the film comes to a standstill in the transport unit 15 regulated by the stopper 32. Next, the stopper 32 is moved to retreat from the film path at step S511, thereby opening the path to the sub-scan unit 18. Thus, the film transport operation is completed.

When the sensor S1 is not turned on within the specified time ("NO" at step S504 and "YES" at step S512), which means that the film is not correctly transported, the timer Tb is cleared at step S513. Subsequently the transport motor is turned off at step S514, and the sub-scan motor is turned off at step S515. Thereby, the film transport system runs down. Also, a flag FNu1 is set to "1" at step S516, and the indication panel of the printer 10 indicates at step S517 that there is a film transport problem in a pre-exposure area, and the film transport operation is terminated.

Figure 25A:
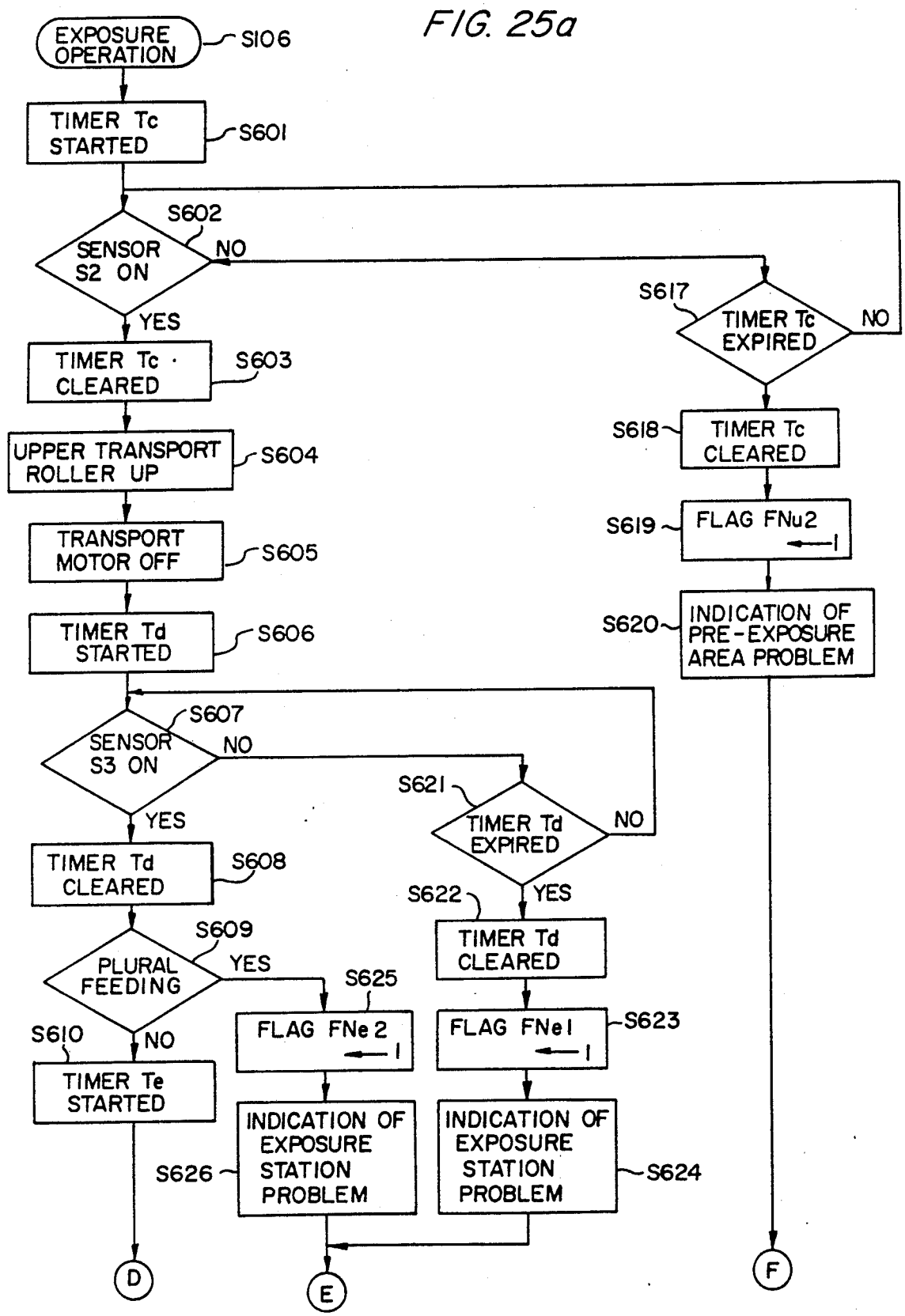
FIG. 25a and 25b are flowcharts showing a procedure of performing an exposing operation.
Figure 25B:
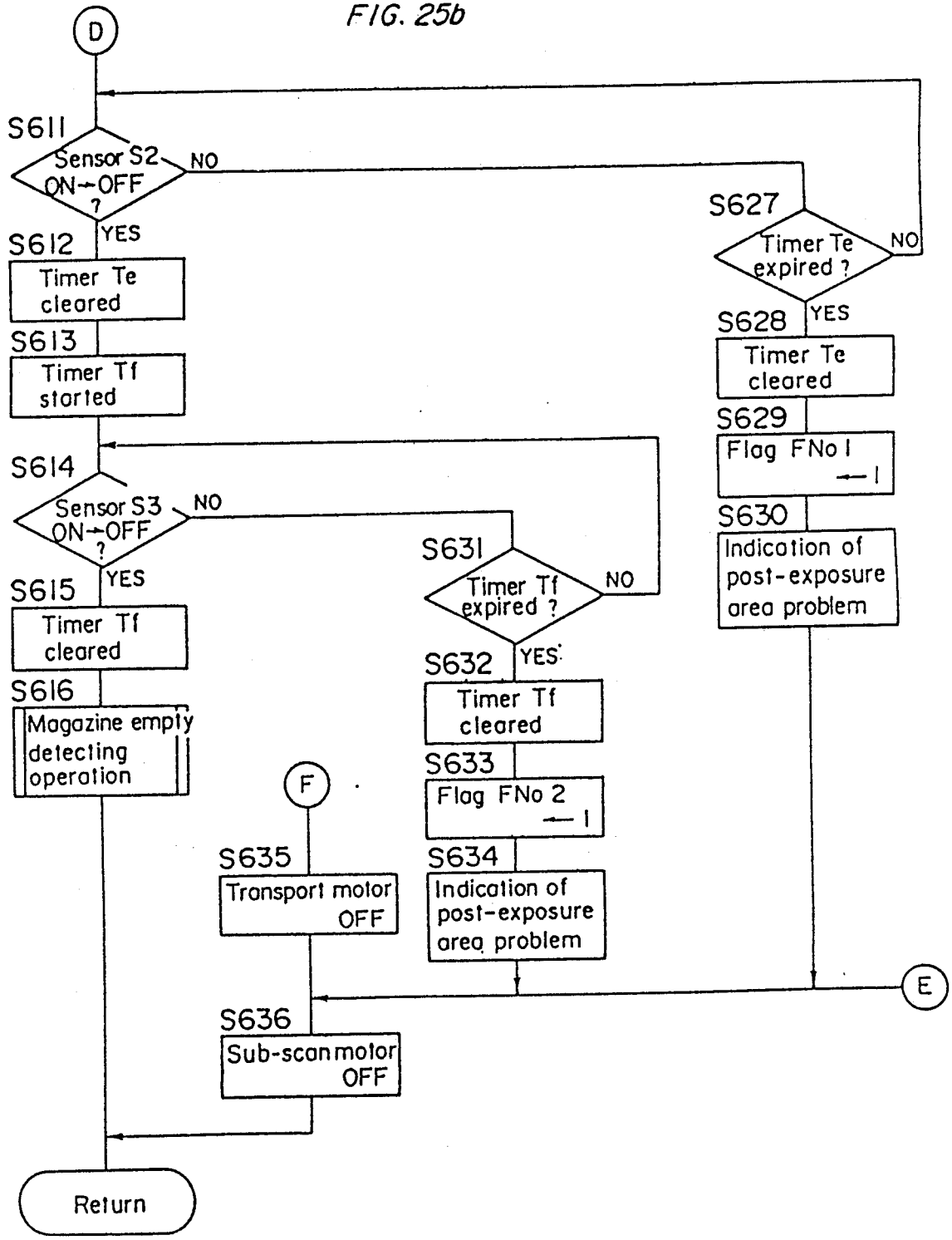

Referring to FIGS. 25a and 25b, the exposing operation, which is carried out at step S106 of the flowchart shown in FIG. 20, is described. In this process, a film is transported to and moved in the sub-scan unit 18.

First, a timer Tc is started at step S601, which timer Tc is used for judging whether the film reaches the transport unit 18 within a specified time. Specifically, it is judged at step S602 from the on/off state of the sensor S2 whether the film comes between the roller 35' and the sub-scan drum 36 within the specified time. When the sensor S2 is turned on within the specified time, which means that the film is transported without any problems, the timer Tc is cleared at step S603. Subsequently the solenoid 68 is turned on at step S604 to raise the upper transport roller 25a, and the transport motor is turned off at step S605 to stop the lower transport roller 25b from rotating. Next, a timer Td is started at step S606 in order to take timing to start an exposure of the film with the optical unit 16 and judge whether the film sensor S3 is turned on within a specified time. When the sensor S3 is turned on within the specified time, which means that the leading edge of the film passes through the exposure station smoothly, the timer Td is cleared at step S608. Also, it is judged at step S609 from a measurement of the thickness of the film(s) between the roller 35' and the sub-scan drum 36 with the sensor S2 whether there are more than one film between the roller 35' and the drum 36. When it is judged that a single film is between the roller 35' and the drum 36, a timer le is started at step S610 so that it is judged at step S611 whether the sensor S2 is turned off within a specified time, that is, whether the film passes through between the roller 35' and the drum 36 within the specified time. When the sensor S2 is turned off within the specified time, the timer Te is cleared at step S612. A timer Tf is started at step S613 in order to judge at step S614 whether the sensor 83 is turned off within a specified time, that is, whether the film passes through the sensor S3 within the specified time. When the sensor S3 is turned off within the specified time, which means that the film is transported into the receive magazine 19 without any problems, the timer Tf is cleared at step S615. Then, a magazine empty detecting operation, which is illustrated in detail in FIG. 32, is carried out at step S616, and the exposing operation is completed.

When the sensor S2 is not turned on within the specified time ("NO" at step S602 and "YES" at step S617), that is, when a transport problem has occurred before the film reaches the sensor S2, the timer Tc is cleared at step S618. Then, a flag FNu2 is set to "1" at step S619, and the indication panel indicates at step S620 that a transport problem has occurred in the pre-exposure area. The transport motor and the sub-scan motor are turned off at steps S635 and S636 respectively, and the exposing operation is terminated.

When the sensor S3 is not turned on within the specified time ("NO" at step S607 and "YES" at step S621), which means that a transport problem has occurred in the exposure station, the timer Td is cleared at step S622. A flag FNe1 is set to "1" at step S623, and the indication panel indicates at step S624 that a transport problem has occurred in the exposure station Then, the sub-scan motor is turned off at step S636 to terminate the operation.

When it is judged at step S609 that there are more than one film between the roller 35' and the sub-scan drum 36, a flag FNe2 is set to "1" a step S625, and the indication panel indicates at step S626 that a transport problem has occurred in the exposure station. Then, the sub-scan motor is turned off at step S636 to terminate the operation.

When the sensor S2 is not turned off within the specified time ("NO" at step S611 and "YES" at step S627), it is judged that a transport problem has occurred in the exposure station. The timer Te is cleared at step S628. A flag FNo1 is set to "1" at step S629, and the indication panel indicates that a transport problem has occurred in a post-exposure area, that is, an area between the exposure station and the receiving magazine 19. Then, the sub-scan motor is turned off at step S636 to terminate the operation.

When the sensor S3 is not turned off within the specified time ("NO" at step S614 and "YES" at step S631), it is judged that a transport problem has occurred around the sensor S3. The timer Tf is cleared at step S632 A flag FNo2 is set to "1" at step S633, and the indication panel indicates at step S634 that a transport problem has occurred in the post-exposure area. Then, the sub-scan motor is turned off at step S636.

Referring to FIG. 26, the transport problem treating operation, which is carried out when a problem takes place during a printing operation, is described. This operation is performed at step S109 of the flowchart shown in FIG. 20.

Figure 27A:
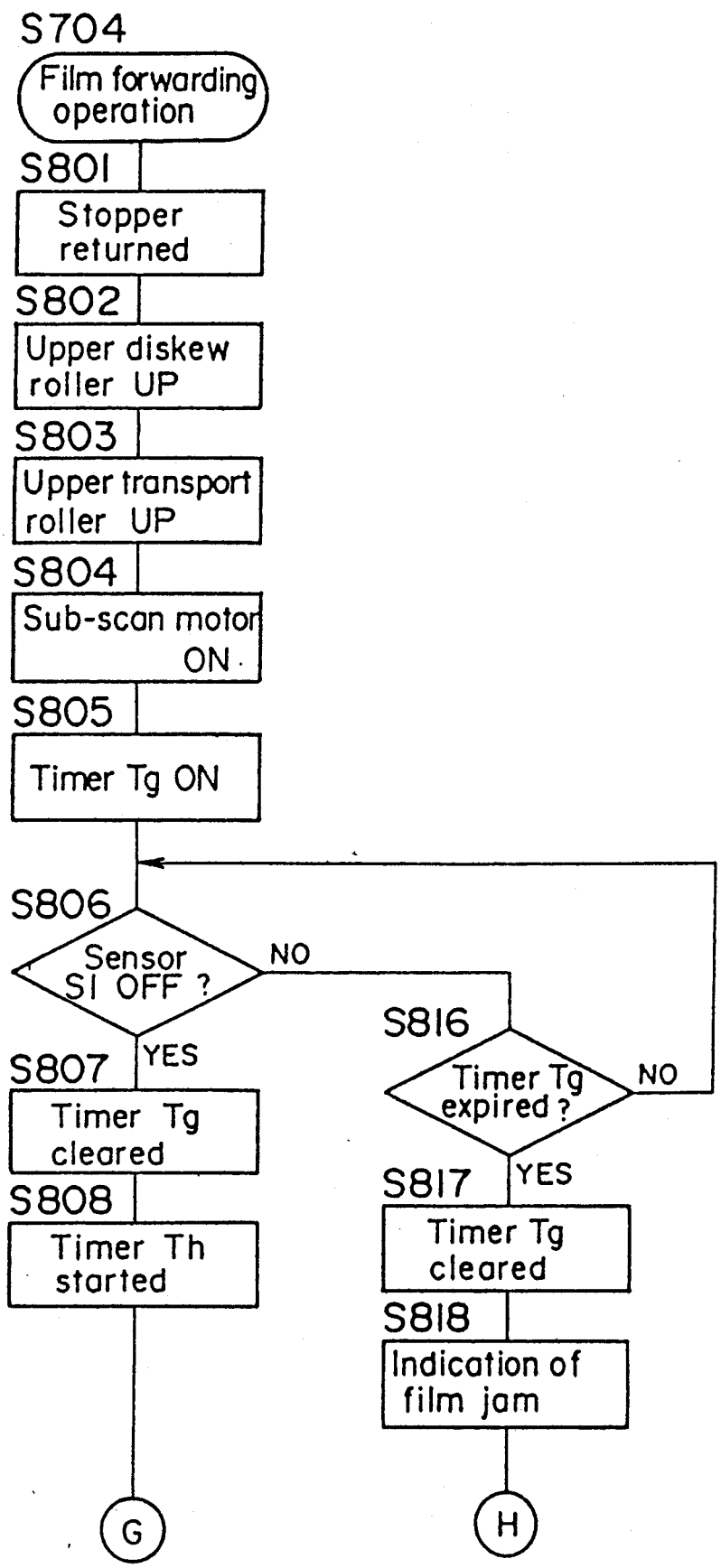
FIG. 27a and 27b are flowcharts showing a procedure of performing a film forwarding operation.
Figure 27B:
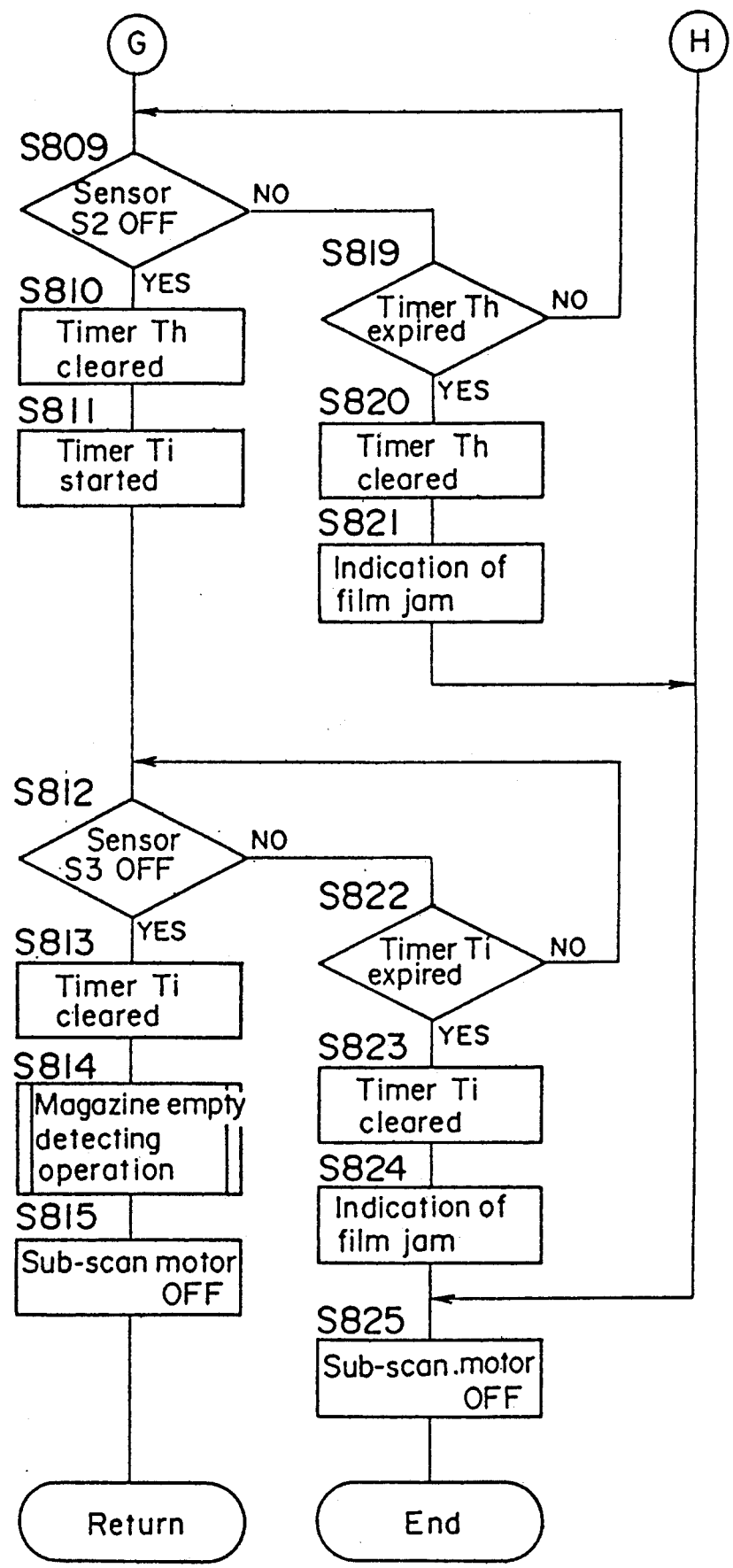
Figure 28A:
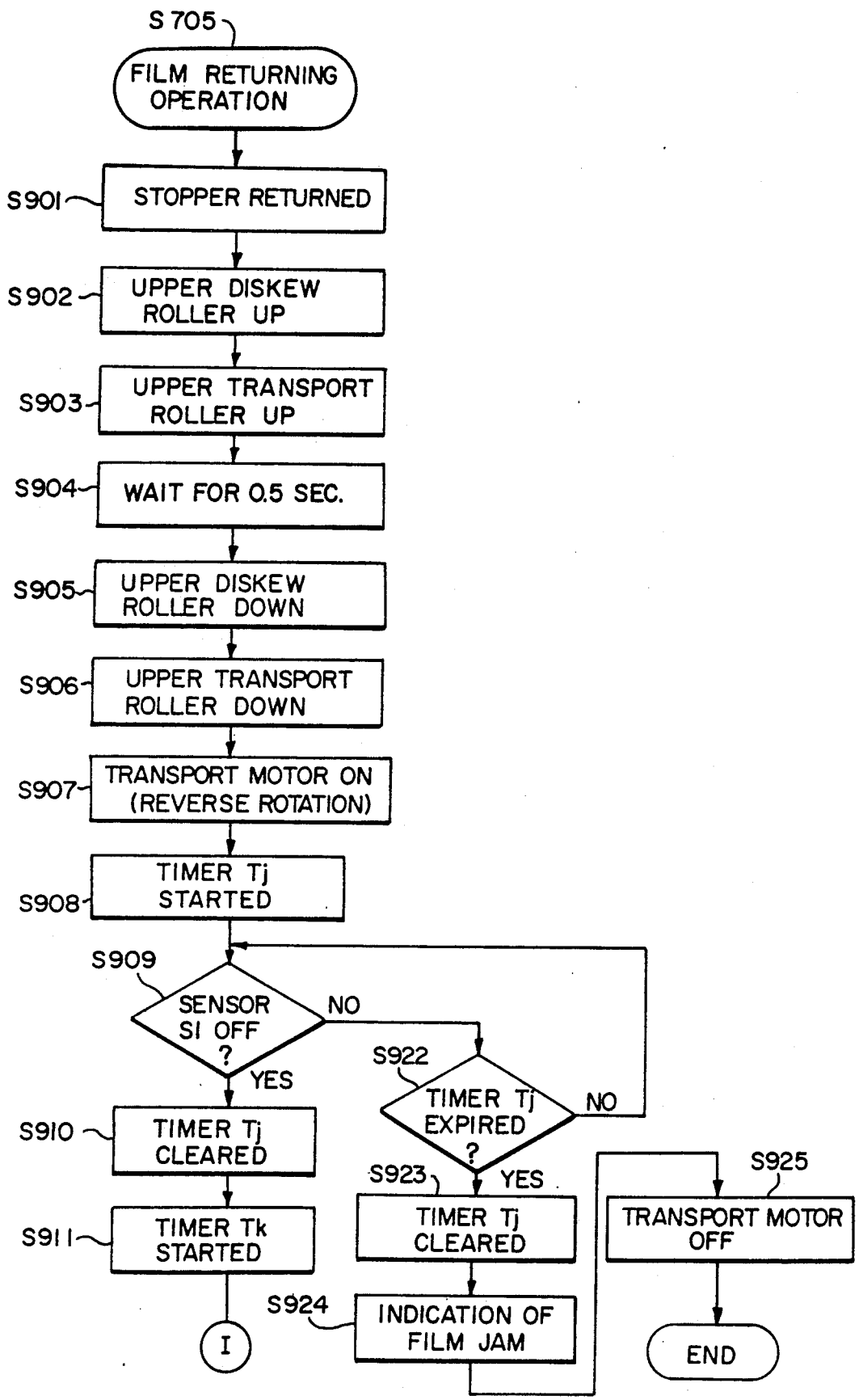
FIGS. 28a and 28b are flowcharts showing a procedure of performing a film returning operation.
Figure 28B:
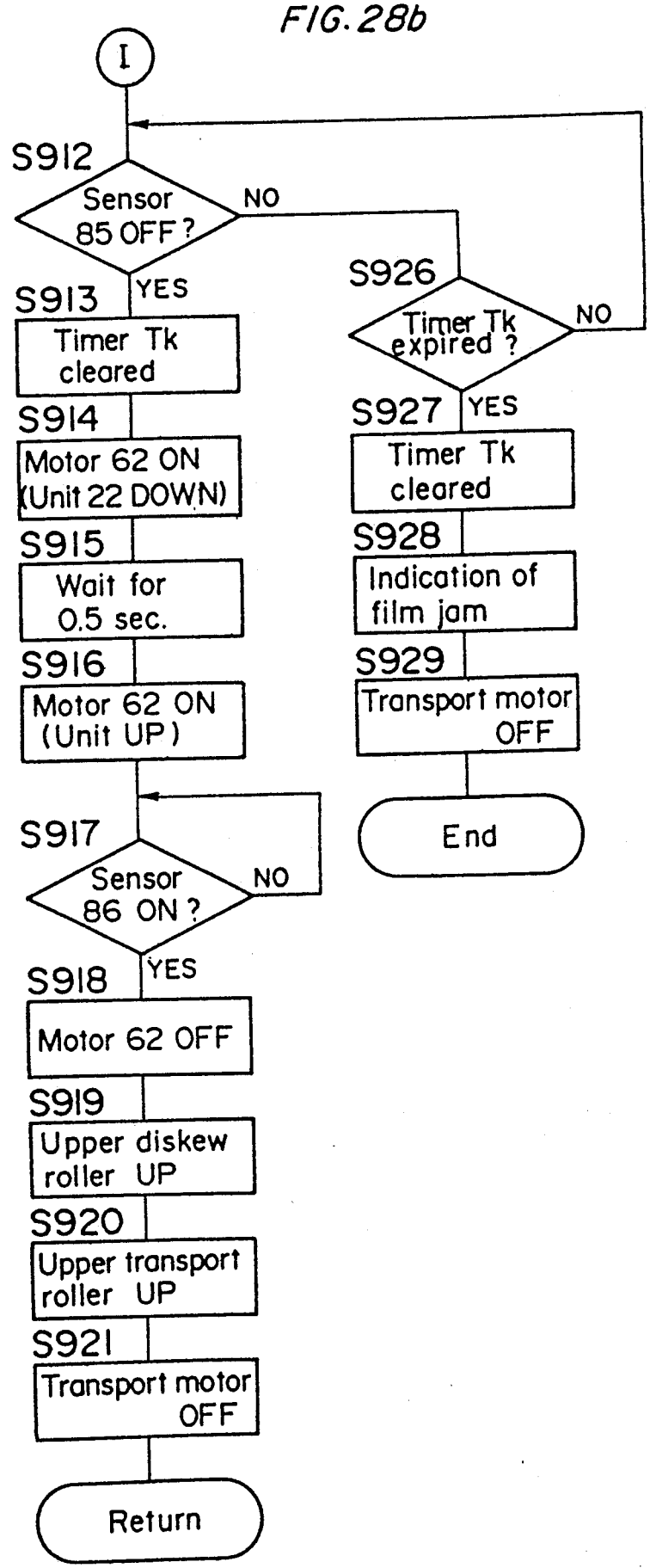
Figure 29:
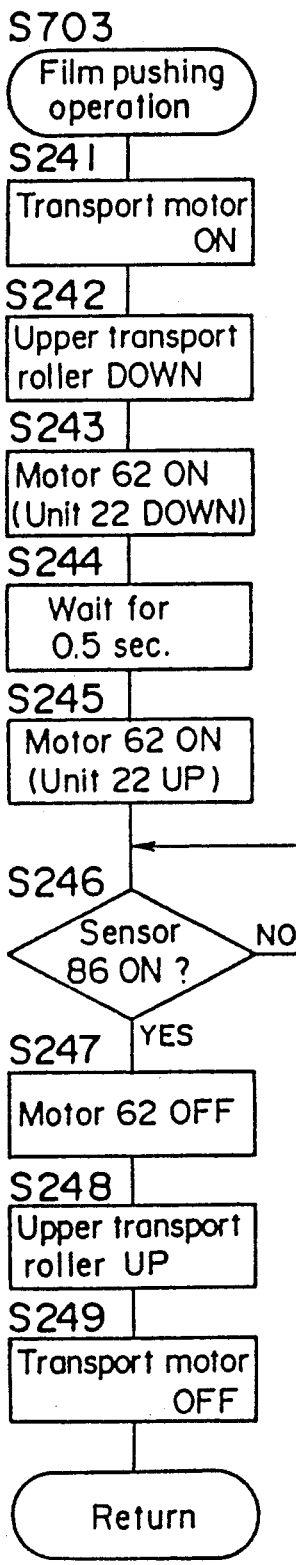
FIG. 29 is a flowchart showing a procedure of performing a film pushing operation.

First, it is judged at step 8701 whether one of the flags FNe1, FNe2, FNo1 and FNo2 is set. When neither of the flags is set, it is judged at step S702 whether either the flag FNu1 or FNu2 is set. When neither of the flags is set, it is judged that the flag FNm is set. In this case, a film Pushing operation, which is illustrated in detail in FIG. 29, is carried out at step S703, and the transport problem treating operation is completed. When either one of the flags FNe1, FNe2, FNo1 and FNo2 is set, it is judged that the problem film has been already exposed. In this case, a film forwarding operation, which is illustrated in detail in FIGS. 27a and 27b, is carried out at step S704. When either the flag FNu1 or FNu2 is set, it is judged that the problem film has not been exposed yet. In this case, a film returning operation, which is illustrated in detail in FIGS. 28a and 28b is carried out at step 8705. Then, the transport problem treating operation is completed.

In the printer 10, when a transport problem takes place, it is automatically decided which way of solving the problem is to be adopted, transporting the Problem film into the magazine 19 or returning the film to the magazine 13, in accordance with the judgment whether the problem has occurred before or after an exposure.

Referring to FIGS. 27a and 27b, the film forwarding operation is described. When a film is stuck after an exposure, this operation is carried out to force the film to enter the receive magazine ]9 because the exposed film can not be reused. This operation is carried out at step S704 of the flowchart shown in FIG. 26. This operation is performed so that the printer 10 automatically recovers from the transport problem.

First, the stopper 32 in the transport unit 15 retreats from the film Path at step S801, and the upper roller of the diskew rollers 30 is moved upward at step S802. Further, the upper transport roller 25a is moved upward at step S803, thereby setting the film free The sub-scan motor is rotated at step S804 to rotate the sub-scan drum 36, and a timer Tg is started at step S805 in order to judge at step S806 whether the sensor S1 is turned off within a specified time. When the sensor S1 is turned off within the specified time, the timer Tg is cleared at step S807. However, when the sensor S1 is still on after the specified time elapsed ("NO" at step S806 and "YES" at step S816), the timer Tg is cleared at step S817. In this case, it is judged that there occurred a complicated film jam from which the printer 10 can not recover automatically, and the indication panel of the printer 10 indicates a film jam at step S818. Then, the sub-scan motor is turned off at step S825. Thus, all the sections of the Printer 10 run down except for the indication section.

When the sensor S1 is turned off within the specified time ("YES" at step S806), the timer Tg is cleared at step 5807. Then, a timer Th is started at step S808 in order to judge at step S809 whether the sensor S2 is turned off within a specified time. When the sensor S2 is turned off within the specified time, it is judged that the film has passed through the sensor S2 although the film was stuck once. The timer Th is cleared at step S810, and at step S811 a timer Ti is set again in order to judge at step S812 whether the sensor S3 is turned off within a specified time. When the sensor S3 is turned off within the specified time, it is judged that the film is transported into the receive magazine 19. Then, the timer Ti is cleared at step S813. Thereafter, at step S814 the film empty detecting operation, which is illustrated in detail in FIG. 32, is carried out as a preparation for the next printing operation. At step S815 the sub-scan motor is turned off. Thus, the film forwarding operation is completed.

When the sensor S2 is not turned off within the specified time ("NO" at step S809 and "YES" at step S819), it is judged that there occurred so complicated a film jam around the sensor S2 that the Printer 10 can not recover from it automatically. The timer Th is cleared at step S820, and the indication panel indicates a film jam at step S821. Then, the sub-scan motor is turned off at step S825. Thus, all the sections of the printer run down except for the indication section.

When the sensor S3 is not turned off within the specified time ("NO" at step S812 and "YES" at step S822), it is judged that there occurred so complicated a film jam around the sensor S3 that the printer 10 can not recover from it automatically. The timer Ti is cleared at step S823, and the indication panel indicates a film jam at step S824. Then, the sub-scan motor is turned off at step S825. Thus, all the sections of the printer 10 run down except for the indication section.

Now referring to FIGS. 28a and 28b, the film returning operation, which is performed at step S705 of the flowchart shown in FIG. 26, is described. This operation is carried out to solve a transport problem which occurred before an exposure. In this operation, the problem film is returned to the magazine 13 in order to be reused.

First, the stopper 32 in the transport unit 15 retreats from the film path at step S901, and the upper roller of the diskew rollers 30 is moved upward at step S902. Further, the upper transport roller 25a is moved upward at step S903, and the Processing comes in a 0.5-second waiting state at step S904. In this state, the problem film is free. Subsequently the upper roller of the diskew rollers 30 and the upper transport roller 25a are moved downward at step S905 and S906 respectively. The lower transport roller 25b is rotated backward at step S907 in order to return the film to the film feeder 14. A timer Tj is set at step S908 in order to judge at step S909 whether the sensor S1 is turned off within a specified time. When the sensor S1 is turned off within the specified time, it is judged that the film is returning from the transport unit 15. The timer Tj is cleared at step S910, and a timer Tk is started at step S911 in order to judge at step S912 whether the sensor 85 is turned off within a specified time. When the sensor 85 is turned off within the specified time, the timer Tk is cleared at step S913, and the arm driving motor 62 is turned on at step S916 to move the sucker holding unit 22 downward by a distance enough to push the film back into the magazine 13. The processing waits for 0.5 seconds in this state at step S915. Thus, the problem film is pushed back into the magazine 13 by the suckers 21a, 21b and 21c. At that time the vacuum pump 93 is not in operation, and the suckers 21a, 21b and 21c do not function to suck the film. Thereafter, the arm driving motor 62 is rotated at step S916 to move the sucker holding unit 22 upward, and it is judged at step S917 whether the sensor 86 has been turned on. When the sensor 86 is turned on, which means that the sucker holding unit 22 reaches the highest position, the arm driving motor 62 is turned off at step S918 Then, the upper roller of the diskew rollers 30 and the upper transport roller 25a are moved upward at step S918. Then, the upper roller of the diskew rollers 30 tion of the transport motor is stopped at step S921. Thus, the film returning operation is completed. When the sensor S1 is still on after the specified time elapsed ("NO" at step S909 and "YES" at step S922), it is judged that there occurred so complicated a film jam around the sensor S1 that the printer 10 can not recover from it automatically. The timer Tj is cleared at step S923, and the indication panel indicates a film jam at step S924. The reverse rotation of the transport motor is stopped at step S925. Thus, all the sections of the printer 10 run down except for the indication section. When the sensor 85 is not turned off within the specified time ("NO" at step S912 and "YES" at step S926), it is judged that there occurred so completed a film jam around the sensor 85 that the printer 10 can not recover from it automatically. The timer Tk is cleared at step S927, and the indication panel indicates a film jam at step S928. Then, the reverse rotation of the transport motor is stopped at step S929. Thus, all the sections of the printer 10 run down except for the indication section.

Now referring to FIG. 29, the film pushing operation, which is carried out at step S703 of the flowchart shown in FIG. 26, is described. In this operation, the problem film is pushed back to the magazine 13.

First, the transport motor is reversed at step S703, and the solenoid 68 is turned on at step S242 to move the upper transport roller 25a downward. The arm driving motor 62 is rotated at step S242 to move the sucker holding unit 22 downward by a specified amount. Thereby, the sucker holding until 22 moves from the highest position to a position proper for pushing the film back to the magazine 13, and the situation is held for 0.5 seconds at step S244. In the state, the film is pushed back into the magazine 13 by the suckers 21a21b and 21c. Further, the vacuum pump 93 is not in operation at that time, and the suckers 21a, 21b and 21c do not function to suck the film.

Next, the arm driving motor 62 is rotated at step S245 to move the sucker holding unit 22 upward, and it is judged at step S246 whether the sensor 86 has been turned on. When the sensor 86 is turned on, which means that the sucker holding unit 22 reaches the highest position, the arm driving motor 62 is turned off at step S247. Then, the upper transport roller 25a is moved upward at step S248, and the reverse rotation of the transport motor is stopped at step S249. Thus, the film pushing operation is completed.

Figure 30:
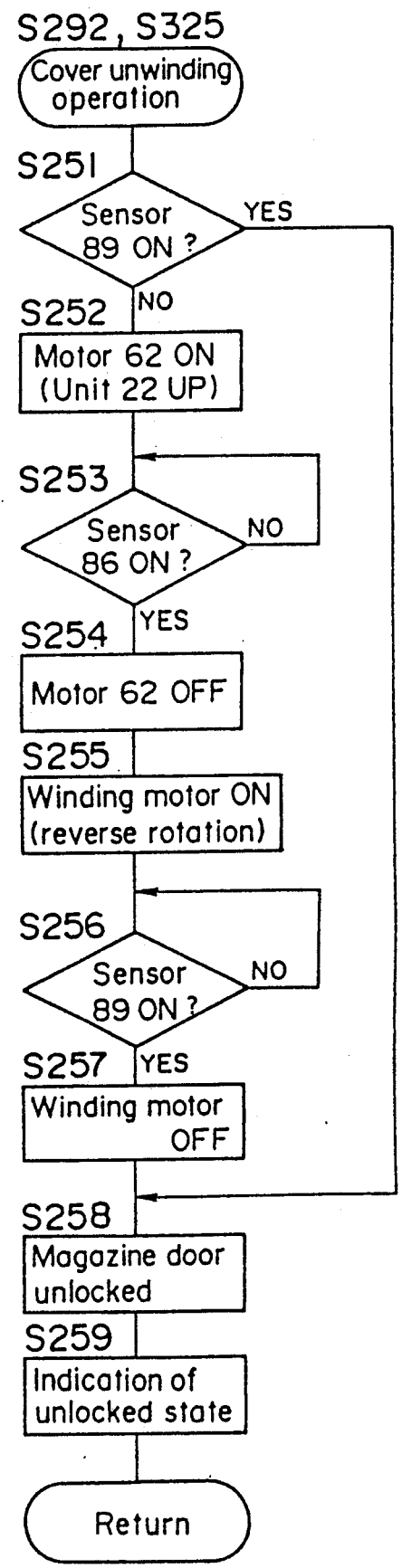
FIG. 30 is a flowchart showing a procedure of performing a cover unwinding operation.

Now referring to FIG. 30, the cover unwinding operation is described. The cover unwinding operation is carried out either when a magazine change switch is operated or when it is judged that the magazine 13 is emptied of films (at steps S292 and S325).

First, the sensor 89 is checked at step S251 in order to judge whether the film cover 41 has been unwound. When the sensor 89 is on, which means that the cover 41 has been unwound, the door through which the magazine 13 was loaded in the printer 10 is unlocked immediately at step S258, and at step S259 the indication panel indicates the door has been unlocked. When the film cover 41 has not been unwound ("NO" at step S251), the arm driving motor 62 is rotated at step S252 to move the sucker holding unit 22 upward. When it is judged from a turning-on of the sensor 86 that the sucker holding unit 22 reaches the highest position ("YES" at step S253), the arm driving motor 62 is turned off at step S254. Next, the winding motor 46 is reversed at step S255 to unwind the cover 41, that is, to return the frame 42 to the initial position. While unwinding, the film cover 41 is pressed by the pressing roller 43 and adheres to the flange 13a of the magazine 13 because of the adhesive tape 38, so that there is no fear of making wrinkles on the cover 41. When the sensor 89 is turned on, which means that the frame 42 supporting the winding shaft 17 is back in the initial position ("YES" at step S256), the reverse rotation of the winding motor 46 is stopped at step S257. Then, the door through which the magazine 13 was loaded is unlocked at step S258, and the indication panel indicates at step S259 that the door has been unlocked. In this state, it is possible to draw the base table 40 in order to change magazines. As the winding section is moving to the initial position, the guide plates 26a and 26b for regulating films with regard to the widthwise direction pivot upward. The pressing roller 43 is moved upward as shown in FIG. 7 by pivoting the levers 49 fitted to the roller 43 upward, and the clamp 56 is disengaged from the winding shaft 17 so that the leading edge of the film cover 41 is discharged from the shaft 17. Thereby, the magazine 13 is able to be discharged from the magazine frame 39 with no obstructions.

Figure 31:
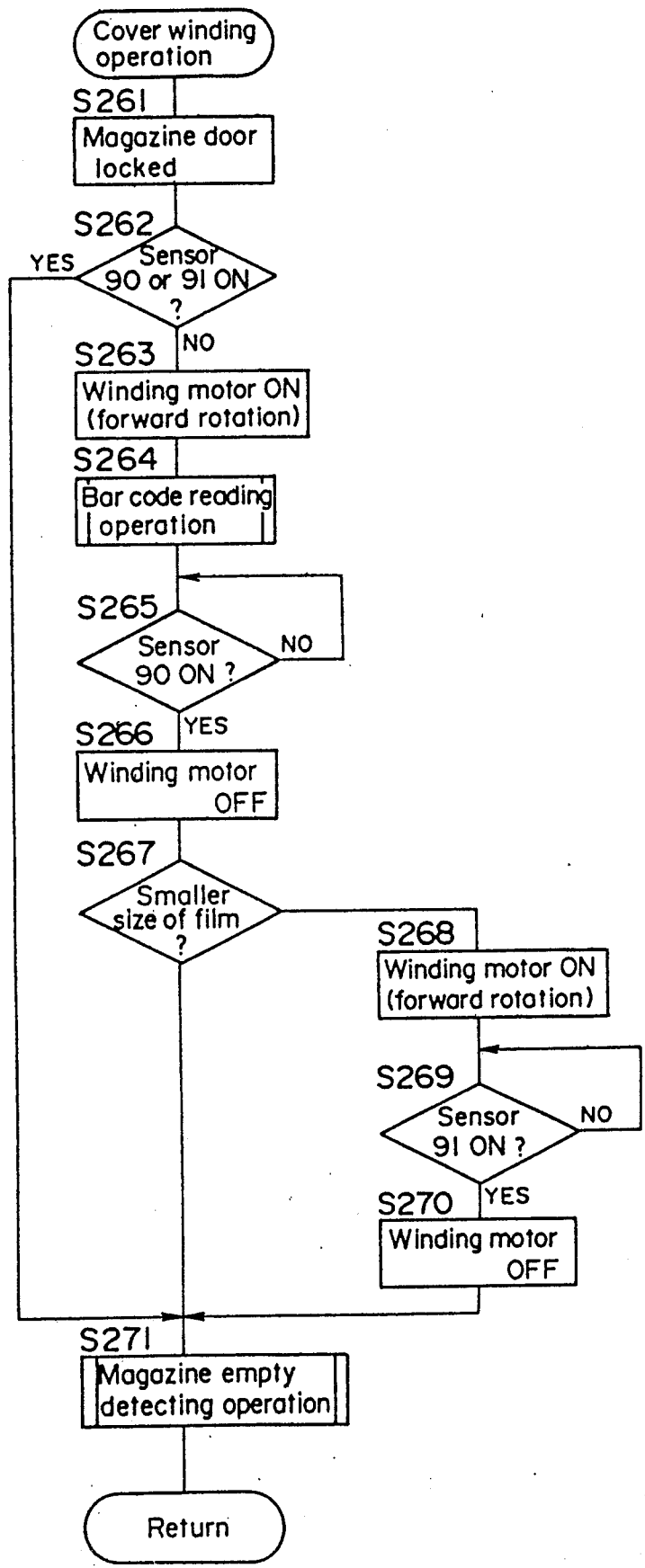
FIG 31 is a flowchart showing a procedure of performing a cover winding operation.

Referring to FIG. 31, a cover winding operation is described. This operation is carried out when the printer 10 is electrified for the first time after the magazine 13 was loaded in the printer 10.

First, the door through which the magazine 13 was loaded in the printer 10 is locked at step S261, and it is judged at step S262 whether either the sensor 90 or the sensor 91 has been turned on. This judgment is made in order to judge whether the winding section including the winding shaft 17 and the pressing roller 43 is in the wind-up position. When either the sensor 90 or the sensor 91 has been turned on, it is judged that the film cover 41 has been wound up. Then, the magazine empty detecting operation, which will be described later, is carried out at step S271, and the film winding operation is completed. On the other hand, when both the sensor 90 and the sensor 91 are off at step S262, the winding motor 46 is driven at step S263 to rotate the winding shaft 17 in the winding direction and to move the winding section. At step S264, the bar code reader 42R disposed at the bottom of the frame 42 (see FIG. 4) reads the bar code stuck on the bottom of the magazine 13 while the winding section is moving. The winding section continues moving until the sensor 90 is turned on. More specifically, when the winding section reaches the wind-up position for the larger size magazine 13 shown in FIG. 13, the sensor 90 is turned on. The turning-on of the sensor 90 is confirmed at step S265, and the winding motor 46 is turned off at step S266 to stop the winding section. It is judged at step S267 from the bar code whether the magazine is for the large size of films or the smaller size of films. When it is the larger magazine 13, it will be possible in this position to insert the guide plates 26a in the respective grooves 13c of the magazine 13, and there is no more need to move the winding section. Then, the magazine empty detecting operation is carried out at step S271 in order to judge whether there are any films in the magazine 13. Thus, the cover winding operation is completed, and the processing returns to the main routine.

When it is judged at step S267 that the magazine is the smaller magazine 13', the winding motor 46 is turned on at step S268 to move the winding section further. When the sensor 91 is turned on, which means that the winding section reaches the wind-up position for the smaller size ("YES" at step S269), the winding motor 46 is turned off at step S270. Then, the processing goes to step S271 to carry out the magazine empty detecting operation, and thus the cover winding operation is completed.

Now referring to FIG. 32, the magazine empty detecting operation is described. In this operation, it is judged whether there are any films in the magazine 13, and this operation is performed at step S271 in the cover winding operation shown in FIG. 31, at step S814 in the film forwarding operation shown in FIGS. 27a and 27b, at step S616 in the exposing operation shown in FIGS. 25a and 25b, etc.

First, the arm driving motor 62 is turned on at step S281 to move the sucker holding unit 22 downward, and it is judged at step S282 whether the sensor 88 disposed in the right bottom part of the holding unit 22 (see FIG. 9) has been turned on. The sensor 88 is turned on when the suckers 21a, 21b and 21c reaches the uppermost film of the film stack 20 in the magazine 13 or the bottom plate of the magazine 13 if there are no films in the magazine 13. When it is judged at step S282 that the sensor 88 is turned on, the arm driving motor 62 is turned off at step S283. Next, it is judged at step S284 whether the sensor 87 disposed in the left bottom part of the sucker holding unit 22 has been turned on. When there are no films in the magazine 13, the actuator 87a of the sensor 87 comes into the concavity 13b of the magazine 13, and the sensor 87 is kept off. When the sensor 87 is on at step S284, it is judged that there are films in the magazine 13, and in this case, the arm driving motor 62 is turned on at step S285 to move the sucker holding unit 22 upward. When the sensor 86 is turned on, which means that the sucker holding unit 22 reaches the highest position ("YES" at step S286), the motor 62 is turned off at step S287. Thus, the magazine empty detecting operation is completed.

When the sensor 87 is off at step S284, it is judged that there are no films in the magazine 13, and the indication panel of the printer 10 indicates at step S288 that the magazine 13 is emptied of films. Subsequently the arm driving motor 62 is turned on at step S289 to move the sucker holding unit 22 upward, and when the sensor 86 is turned on ("YES" at step S290), the motor 62 is turned off at step S291. Next, the cover unwinding operation, which was described above referring to FIG. 30, is performed at step S292 as a preparation for a magazine change. Then, all the sections of the printer 10 run down except for the indication section.

The cover sticking/removing device which, as described above, automatically opens the film cover 41 and unwinds the cover 41 to shield the films 20 in the magazine 13 has many advantages as follows:

(1) Because the elastic pressing roller 43 presses the film cover 21 against the adhesive tape 38 stuck on the magazine flange 13a, the film cover 21 firmly adheres to the magazine 13 even if the magazine flange 13a is distorted.

(2) The operator can put the pressing roller 43 to a retreating position easily, thereby changing magazines easily with no obstructions.

(3) The leading edge of the film cover 41 is firmly nipped between the clamp 56 and the winding shaft 17, which ensures cover winding.

(4) Since the force of the frame 42 moving along the magazine 13 is transmitted to the both edges of the winding shaft 17, there is no fear that the winding shaft 17 moves over the magazine 13 askew. Thereby, no wrinkles are made on the cover 41.

(5) While the winding section is moving at a constant speed to wind the cover 41, the bar code on the magazine 13 is read, and therefore there will be almost no errors in reading the bar code.

Although the present invention has been described in connection with the embodiment above, it is to be noted that various changes and modifications are apparent to those who are skilled in the art. Such changes and modifications are to be understood as included within the scope of the present invention defined by the appended claims, unless being separated therefrom.

For example, although the elastic pad 39a disposed on the magazine frame 39 and the elastic pressing roller 43 bring improvements in unwinding the cover 41 in the abovedescribed embodiment, it is possible to achieve the same effects even if either the pad 39a or the roller 43 is elastic. Also, when the film cover 41 is elastic, it is no need to make the pad 39a and the roller 43 elastic.

Further, subjects to be fed from the magazine 13 may be copy sheets or sheets coated with resin as well as photosensitive films.

What is claimed is:

1. An image forming apparatus provided with a magazine in which sheets are stacked, said image forming apparatus comprising:
   a flexible cover member for the magazine, which cover member is capable of adhering to and separating from a flange of the magazine;
   means for removing the cover member from the flange of the magazine while moving in one direction along the flange of the magazine; and
   means for sticking the cover member on the flange of the magazine while moving in a direction reverse to the direction in which the cover removing means moves.

2. An image forming apparatus as claimed in claim 1, wherein the cover removing means has a shaft around which the cover member is wound.

3. An image forming apparatus as claimed in claim 1, wherein the cover removing means and the cover sticking means move together.

4. An image forming apparatus as claimed in claim 1, wherein the cover sticking means has an elastic pressing member.

5. An image forming apparatus as claimed in claim 4, wherein the cover sticking means has a roller coated with elastic material.

6. An image forming apparatus as claimed in claim 1, wherein the magazine is mounted on an elastic member.

7. An image forming apparatus as claimed in claim 1, wherein the magazine is detachable from the image forming apparatus.

8. A cover sticking/removing device for sticking a flexible cover member on and removing the cover member from a flange of a magazine in which sheets are stacked, said cover sticking/removing device comprising:
   means for removing the cover member from the flange of the magazine while moving in one direction along the flange of the magazine; and
   means for sticking the cover member on the flange of the magazine while moving in a direction reverse to the direction in which the cover removing means moves.

9. A cover sticking/removing device as claimed in claim 8, wherein the removing means has a shaft around which the cover member is wound.

10. A cover sticking/removing device as claimed in claim 8, wherein the cover sticking means and the cover removing means move together.

11. A cover sticking/removing device as claimed in claim 8, wherein the cover sticking means has a roller coated with elastic material.

12. An image forming apparatus with a detachable magazine in which sheets are stacked, comprising:
   a cover member for covering an opening of the magazine;
   means for removing the cover member from the magazine while moving in a predetermined direction;
   means for sticking the cover member on the magazine while moving in a direction reverse to the predetermined direction,
   wherein said cover removing means and cover sticking means move in unison.

* * * * *

UNITED STATES PATENT AND TRADEMARK OFFICE
Certificate

Patent No. 5,051,775

Patented: September 24, 1991

On petition requesting issuance of a certificate for correction of inventorship pursuant to 35 U.S.C. § 256, it has been found that the above-identified patent, through error and without any deceptive intent, improperly sets forth the inventorship.

Accordingly, it is hereby certified that the correct inventorship of this patent is: Yukiyoshi Yamakoshi, Hiroshi Tomita, Hajime Takei, Fuminori Moro, Naoyuki Matsuda, Homare Sano, Richard R. Lemberger, Stuart J. Wyman, Paul C. Schubert and Terrace H. Joyce.

Signed and Sealed this Fifth Day of September, 1995.

MICHAEL L. GELLNER
*Supervisory Patent Examiner*
*Art Unit 2101*